(12) United States Patent
Ajiki et al.

(10) Patent No.: US 7,985,011 B2
(45) Date of Patent: Jul. 26, 2011

(54) VEHICLE LAMP

(75) Inventors: Shuichi Ajiki, Tokyo (JP); Koichi Masuyama, Tokyo (JP); Naoya Sone, Tokyo (JP); Sadayuki Konishi, Tokyo (JP); Yasuo Toko, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 318 days.

(21) Appl. No.: 12/409,944

(22) Filed: Mar. 24, 2009

(65) Prior Publication Data

US 2009/0262547 A1 Oct. 22, 2009

(30) Foreign Application Priority Data

Mar. 24, 2008 (JP) .................................. 2008-075916

(51) Int. Cl.
*F21V 33/00* (2006.01)

(52) U.S. Cl. .................. 362/511; 362/613; 362/545

(58) Field of Classification Search .................. 362/611, 362/612, 613, 543, 544, 545, 511
See application file for complete search history.

(56) References Cited

U.S. PATENT DOCUMENTS

| | | | |
|---|---|---|---|
| 4,562,519 A | 12/1985 | Deves | |
| 6,955,459 B2 * | 10/2005 | Mochizuki et al. | 362/602 |
| 7,244,056 B2 | 7/2007 | Koike | |
| 7,686,489 B2 * | 3/2010 | Ajiki et al. | 362/511 |
| 7,806,538 B2 * | 10/2010 | Ajiki et al. | 362/19 |
| 2006/0044825 A1 | 3/2006 | Sa | |
| 2007/0008736 A1 * | 1/2007 | Gasquet | 362/511 |

FOREIGN PATENT DOCUMENTS

| | | |
|---|---|---|
| JP | 2001-076510 A | 3/2001 |
| JP | 2006-509343 A1 | 3/2006 |
| JP | 2008226542 | 9/2008 |

* cited by examiner

*Primary Examiner* — Laura Tso
(74) *Attorney, Agent, or Firm* — Kenealy Vaidya LLP

(57) ABSTRACT

A vehicle lamp can create a desired distribution pattern easily with a simple configuration while having a thin body and light weight. The vehicle lamp can include a light source unit and a convex projection lens configured to project light from the light source unit forward in the direction of light illumination. The light source unit can include a light guide plate having a light emission surface and made of a transparent material to the visible light range and can include a light source disposed in front of one end face of the light guide plate. The projection lens can have a focus arranged on or near the light emission surface of the light guide plate. The light source unit can include a reflection sheet configured to reflect light from the light guide plate back into the light guide plate and can have a shape configured to provide a cutoff pattern. The reflection sheet can be located adjacent an edge of the light guide plate adjacent the light source. A high beam light source unit can be disposed adjacent or on the reflection sheet closer to the projection lens.

23 Claims, 23 Drawing Sheets

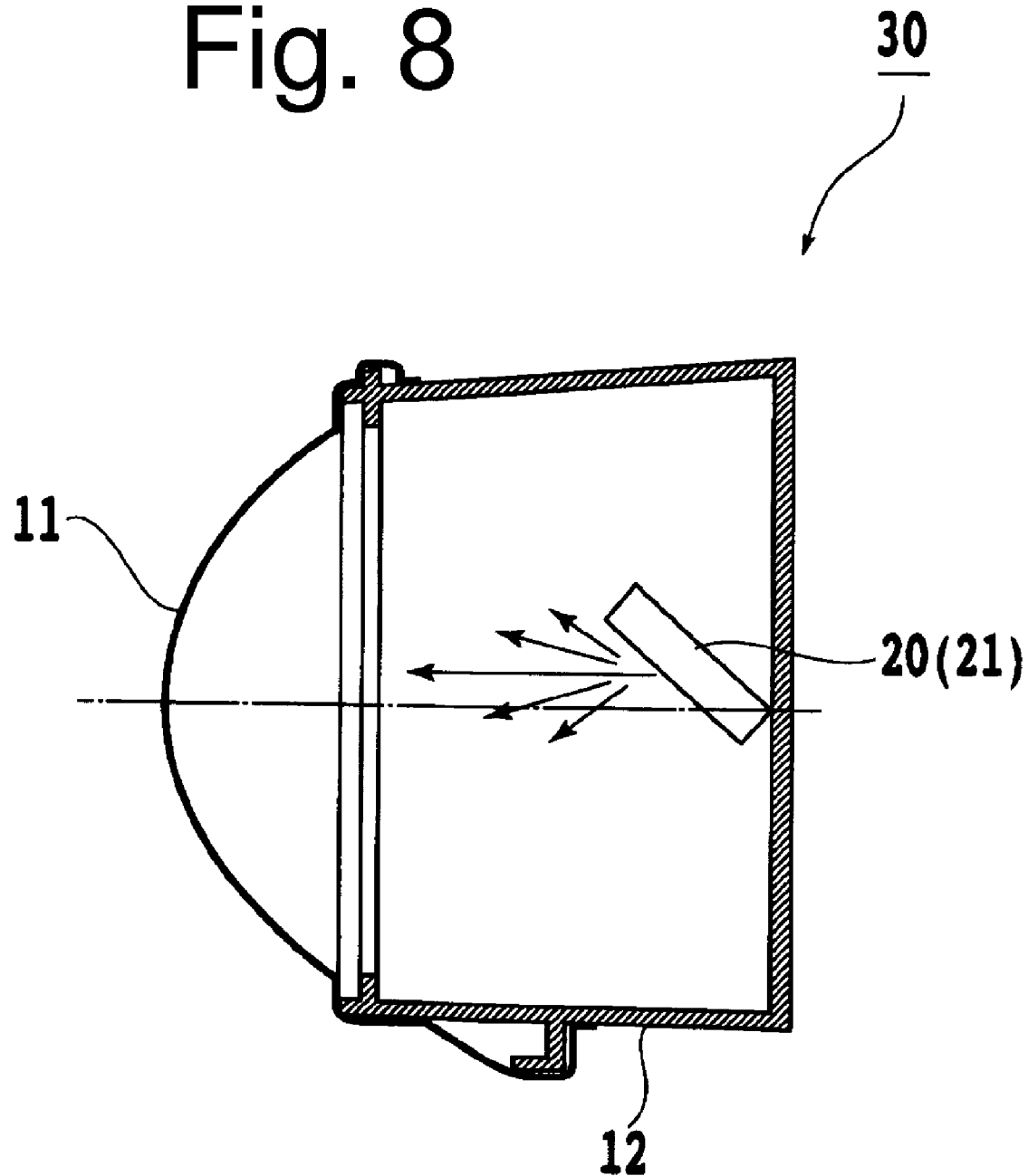

VEHICLE LAMP

This application claims the priority benefit under 35 U.S.C. §119 of Japanese Patent Application No. 2008-075916 filed on Mar. 24, 2008, which is hereby incorporated in its entirety by reference.

BACKGROUND

1. Technical Field

The presently disclosed subject matter relates to a vehicle lamp such as a headlamp, an auxiliary light, a fog lamp, or other light which is composed of a light source unit using a plurality of point or line light sources and possibly a convex lens. Also, the presently disclosed subject matter relates to a vehicle lamp such as a headlamp which has a daytime running light function.

2. Description of the Related Art

Vehicle lamps using a light guide plate have been known heretofore. Examples thereof include a vehicle lamp or a headlamp as disclosed in Japanese Translation of PCT Patent Application No. 2006-509343, and a common projector type headlamp as disclosed in Japanese Patent Application Laid-Open No. 2001-076510.

FIG. 1 shows the configuration of the vehicle lamp as disclosed in Japanese Translation of PCT Patent Application No. 2006-509343.

In FIG. 1, the vehicle lamp 1 can include a housing 2, a light-transmitting cover member 3, a light guide plate 4, a light source 5, and a reflection plate 4d (see also FIG. 2). The housing 2 has an opening 2a configured to emit light therethrough. The light-transmitting cover member 3 has a light incident surface 3a and a light emission surface 3b, and is fixed to the housing 2 so as to enclose the opening 2a of the housing 2. The light guide plate 4 is formed in a plate-like shape and is disposed inside the housing 2. With reference to FIG. 2, the light guide plate 4 has a light incident surface 4a configured to let light in, formed on a lateral side, and a light emission surface 4b formed on the front side facing toward the cover member 3. The light guide plate 4 is also provided with a scatter pattern 4c configured to scatter the light incident on the light incident surface 4a toward the light emission surface 4b. The light source 5 is arranged next to the light incident surface 4a of the light guide plate 4, and emits light toward the light incident surface 4a. The reflection plate 4d is arranged on the rear surface of the light guide plate 4, and can reflect light toward the front side of the light guide plate 4.

The light incident surface 3a and/or the light emission surface 3b of the cover member 3 can have lens patterns 3c configured to impart a certain pattern to emission light.

In this vehicle lamp 1, as shown in FIG. 2, the light emitted from the light source 5 can enter the light guide plate 4 through the lateral side (light incident surface) 4a. Traveling through the interior of the light guide plate 4 with total reflections, the light is scattered by the scatter pattern 4c formed on the rear surface of the light guide plate 4, and is projected from the front side (light emission surface) 4b of the light guide plate 4.

The light emitted in front of the light guide plate 4 illuminates the front area in a desired pattern through the cover member 3 which has the lens patterns 3c.

The light source 5 can include a plurality of light emitting diodes (LEDs). A lens or other member can be arranged in front of this light source 5 in order to provide a desired light distribution characteristic.

FIG. 3 shows the configuration of the common projector type headlamp as disclosed in Japanese Patent Application Laid-Open No. 2001-076510. The headlamp 6 can include a light bulb 7 serving as a light source, a reflector 8, a projection lens 9, and a shielding member 9a.

The reflector 8 can include an elliptic reflection surface having a first focus (rear side focus) where the bulb 7 is disposed and a major axis horizontally extending forward in the direction of light illumination. The inner surface thereof can serve as the reflection surface.

The projection lens 9 can include a convex lens, such as an aspheric lens, having a light-source side focus (rear side focus) at or near which the shielding member 9a is disposed.

The shielding member 9a is configured to impart a light distribution pattern for forming a low beam pattern of light emitted forward in the direction of light illumination. The shielding member 9a can include an upper edge with a predetermined shape configured to form a cutoff line in the light distribution pattern.

In the headlamp 6 configured as described above, light emitted from the bulb 7 can form a high luminous image (a high brightness image or a collected light image) having an inverted light distribution pattern (horizontally and vertically inverted) near the focus 9b of the projection lens 9 directly or after being reflected by the reflector 8. This high luminous image can be projected forward in the direction of light illumination while reversed by the projection lens 9.

In this case, part of the high luminous image can be shielded by the shielding member 9a so that a cutoff line C can be formed by the upper edge of the shielding member 9a (see FIG. 4). Then, the high luminous image can be projected forward as a low beam.

It should be noted that the light distribution pattern shown in FIG. 4 for a right-side traveling vehicle has the cutoff line C for illuminating light also the area on the right-upper side.

In this case, the reflector 8 has a deformed elliptic cross section in order for light emitted from the bulb 7 to enter the projection lens 9 as much as possible. The bulb 7 is disposed near the one focus of the ellipse and the light incident surface of the projection lens 9 is disposed near the other focus of the ellipse. Accordingly, by properly designing the shape of the reflector 8, various light distribution patterns can be formed in accordance with the intended applications.

In the vehicle lamp 1 as disclosed in Japanese Translation of PCT Patent Application No. 2006-509343, light is scattered with the scatter pattern 4c before taken out of the light guide plate 4. Accordingly, the illuminated light can have a proper directional characteristic near the complete scattered light. The lens pattern 3c as used herein, thus, might not provide a suitable light distribution pattern having a desired luminous intensity as a vehicle light such as a headlamp and a vehicle auxiliary lamp such as a fog lamp, or having a bright-dark boundary.

Furthermore, a light distribution pattern can be formed by a plurality of separate lens patterns 3c. This can complicate the optical configuration of each individual lens pattern 3c. For example, some lens patterns are irradiated with the scattered light of the light guide plate 4 from peripheral areas other than the focal position. This can make it difficult to produce a given distribution pattern or cutoff line forward through the lens patterns 3c.

The projector type headlamp as disclosed in Japanese Patent Application Laid-Open No. 2001-076510 uses the reflector 8 as in the previous case. This kind of reflector 8 can form a light distribution pattern near the focus 9b of the projection lens 9, which is then projected onto a road by the projection lens 9. Accordingly, in some cases the headlamp 6 can include the shielding member 9a inside the lamp. This can enlarge the headlamp 6 as a whole, resulting in increased weight and enlarged depth.

Furthermore, the reflector 8 used in this type of headlamp 6 should be designed in accordance with a desired shape of the light emitting portion of a bulb 7. This can increase the time required for designing such a reflector.

SUMMARY

The presently disclosed subject matter was devised in view of these and other problems, characteristics, and features, and in association with the conventional art. According to an aspect of the presently disclosed subject matter, a vehicle lamp can create a desired distribution pattern easily with a simple configuration while having a thin body and light weight.

According to another aspect of the presently disclosed subject matter, a vehicle lamp can include a light source unit including a light guide plate with a light emission surface on its surface, and a point or line light source opposed to one end face of the light guide plate. The light guide plate can be made of a plate-like material transparent in the visible light region. A convex projection lens can be configured to focus light emitted from the light source unit and to project the light forward in the direction of light illumination. In this configuration, the light guide plate can have a prism array on its rear surface extending with a serrated cross section from the one end face of the light guide plate to the opposite end face, and in a direction parallel with the end face (or in a corrugate configuration laterally). The prism array can include a plurality of prism surfaces, with each prism surface being obliquely formed so that when light enters the light guide plate from the light source side and impinges thereon, the light is totally reflected into small angles of incidence to the emission surface. The vehicle lamp can further include a light guide part formed in the area adjoining to the edge of the light guide plate on the light source side, such as on the surface and rear surface of the light guide plate, and the light guide part can be configured to reflect light from the light guide plate. The vehicle lamp can further include a reflection sheet configured to reflect light from the surface of the light guide plate back into the light guide plate, having a shape corresponding to a desired cutoff pattern for a headlamp, which can be formed in the area adjoining to the edge of the light guide plate on the light source side, such as on the surface of the light guide plate. Furthermore, on the rear surface of the light guide plate, a reflection sheet may be provided to reflect light that may not be totally reflected by the prism surfaces but is, instead, refracted by or transmitted through the prism surface, so that the light is reflected back into the light guide plate. The projection lens can be disposed such that a focus thereof on the side of the light source unit can be located on or near the light emission surface of the light guide plate of the light source unit.

In a vehicle lamp according to the presently disclosed subject matter, a high beam light source unit can be disposed adjacent or on the reflection sheet closer to the projection lens. Alternatively, the reflection sheet can be retracted from an area of the surface of the light guide plate so that the light reaching the area where the reflection sheet is provided can be reflected by the reflection sheet when the reflection sheet is located on the area whereas when the reflection sheet is retracted from the area the light reaching the area can be projected through the projection lens in the direction of light illumination without reflected by the reflection sheet so as to form a high beam distribution pattern.

In a vehicle lamp according to the presently disclosed subject matter, the projection lens can include, at least in part, a cylindrical lens having an axis extending in a lateral direction.

In a vehicle lamp according to the presently disclosed subject matter, the projection lens can include convex lenses at both ends and a cylindrical lens therebetween.

In a vehicle lamp according to the presently disclosed subject matter, the projection lens can include convex portions protruding laterally outward at both ends and a cylindrical lens therebetween.

In a vehicle lamp according to the presently disclosed subject matter, each prism surface of the prism array and the light emission surface of the light guide plate can form an angle of 0 degrees to 45 degrees.

In a vehicle lamp according to the presently disclosed subject matter, the light emission surface of the light guide plate can be formed of a shape corresponding to a desired cutoff pattern for a headlamp.

In a vehicle lamp according to the presently disclosed subject matter, the end face on the light source side of the light guide plate can be disposed on the cutoff pattern side.

In a vehicle lamp according to the presently disclosed subject matter, the light guide plate can be formed to correct the spherical aberration of the projection lens.

In a vehicle lamp according to the presently disclosed subject matter, the light guide plate can be curved to correct the spherical aberration of the projection lens.

A vehicle lamp according to the presently disclosed subject matter can include an optical sheet configured so that the direction of the maximum luminous intensity of the light emitted from the light guide plate coincides with the direction of the optical axis of the projection lens, with the optical sheet being disposed near the light emission surface of the light guide plate.

In a vehicle lamp according to the presently disclosed subject matter, the light guide plate can be disposed obliquely with respect to an optical axis of the projection lens by a predetermined angle in order to maximize the light entering the projection lens.

In a vehicle lamp according to the presently disclosed subject matter, the high beam light source unit can include a high beam light source, and a high beam light guide plate configured to guide light from the high beam light source forward in the direction of light illumination.

In a vehicle lamp according to the presently disclosed subject matter, the projection lens can include convex lenses at both ends and a cylindrical lens therebetween, the high beam light source unit can be provided on or adjacent the optical axis of any of, or both of, the convex lenses.

In a vehicle lamp according to the presently disclosed subject matter, the high beam light source unit can emit light with a low intensity to form a day-time running light (DRL) distribution pattern in the direction of light illumination.

Another vehicle lamp according to the presently disclosed subject matter can project a high luminance pattern or a high brightness pattern formed on the light emission surface of the surface light source unit by the projection lens in front of the vehicle.

Such a high luminance pattern or a high brightness pattern can be formed on the light emission surface by the following process.

That is, the light emitted from the light source can enter the light guide plate through the one end face, and then, can enter the light emission surface or rear surface of the light guide plate. The light having entered the light emission surface can be refracted and emitted toward the projection lens, or it can be totally reflected, in accordance with the angle of incidence to the emission surface. The totally reflected light can reach the rear surface of the light guide plate. A prism array can be formed on the rear surface of the light guide plate. Accordingly, the light having reached the rear surface can be totally reflected or refracted in accordance with the angle of incidence to the prism surface. When totally reflected by the prism surface, the light can be directed such that the angle of incidence to the emission surface becomes small.

In this exemplary embodiment, the angle of incidence can be determined by the angle of the prism surface. Accordingly, by adjusting the angle of the prism surface, the angle of incidence to the emission surface can be set to an angle smaller than a critical angle even when the light is totally reflected by the rear surface one time, or the light can be projected by a plurality of reflections. Adjusting the angle of the prism surface can control the intensity distribution of light from the emission surface so that a desired high luminous pattern can be formed on the light emission surface.

When the angle of the prism surface to the light emission surface is set to 45 degrees or smaller, almost all of the light can be totally reflected. In addition to this, even the light having been refracted (transmitted) by (through) the prism surface can be reflected by the reflection sheet, and accordingly, the reflected light can enter the rear surface of the light guide plate back into the light guide plate. This can reduce or prevent the light loss.

This can eliminate the need for a reflecting mirror, such as the reflecting mirror 8 used in the conventional headlamp of FIG. 3, thereby reducing the entire size of the lamp while providing lower cost associated with manufacture of the lamp.

When the light guide part configured to reflect light from the light guide plate is provided in the area adjoining to the edge on the light source side, such as on the surface and rear surface of the light guide plate, the light guide part can repeat reflections between the surface and rear surface of the light guide plate, in the area adjoining the edge of the light guide plate on the light source side, thereby reducing brightness variations ascribable to distances between a plurality of point sources arranged in a row. This can make it possible to form the predetermined light distribution pattern with more uniform brightness.

When the vehicle headlamp includes a reflection sheet configured to reflect light from the surface of the light guide plate back into the light guide plate, having a shape corresponding to a desired cutoff pattern, which may be formed in the area adjoining the edge on the light source side, such as on the surface of the light guide plate, the cutoff pattern can be provided to the distribution pattern in accordance with the shape of the reflection sheet. The light shielded by this cutoff pattern can be reflected by the reflection sheet back into the light guide plate, thereby improving the efficient use of the light from the light source.

The high beam light source unit(s) including a light source and a light guide plate for guiding light forward in the direction of light illumination can be disposed adjacent or on the reflection sheet closer to the projection lens. In this configuration, during the low beam traveling mode, the light source unit can be driven to emit light. In this way, the light emitted from the light source of the unit can impinge on the light guide plate form the light source side and then can be totally reflected within the light guide plate and projected from the surface of the light guide plate.

The light projected from the light guide plate can pass through the projection lens to be projected forward in the optical axis direction, thereby forming a low beam light distribution pattern.

In this configuration, the high beam light source unit can be disposed adjacent or on the reflection sheet closer to the projection lens, such that the high beam light source can be shielded by the reflection sheet so as not to hinder the path of light from the light source unit to the projection lens. Accordingly, the high beam light source unit never or rarely prevents the low beam light flux from traveling from the light source unit via the projection lens forward in the direction of light illumination.

Instead of the high beam light source unit, the reflection sheet can be configured to be retractable from the surface of the light guide plate. When the reflection sheet is disposed on the surface of the light guide plate, the light reaching the area can be reflected by the reflection sheet. When the reflection sheet is retracted from the surface of the light guide plate, the light reaching the area may not be reflected by the reflection sheet, but it can be projected forward via the projection lens in the direction of light illumination to form a high beam light distribution pattern. In other words, the reflection sheet can be moved to a retracted position during the high beam traveling mode. Accordingly, the light shielded and reflected by the reflection sheet during the low beam traveling mode can be freely projected without any obstruction of the reflection sheet so as to be projected via the projection lens forward in the direction of light illumination.

In this case, the projected light can form a distribution pattern above the bright-dark boundary formed by the edge of the reflection sheet. Accordingly, the entire light emitted from the light guide plate can form a favorable high beam light distribution patter.

If the projection lens includes a cylindrical lens having an axis extending in a lateral direction, it might lack light-gathering capability with respect to the lateral direction. The projection lens, however, can be arranged laterally across a sufficiently wide area with respect to the light source unit. This can improve the incident efficiency from the light source unit, thereby forming a light distribution pattern of higher brightness.

The light transmitted through the projection lens can be somewhat diffused to the right and left by the effect of the cylindrical lens. This can produce a horizontally wide distribution pattern, which can reduce brightness variations between light sources if the light sources are point sources laterally spaced from one another.

The projection lens can include convex lenses at both ends and a cylindrical lens therebetween. The light to be diffused, and entering the light guide plate obliquely toward the outside, can be refracted or reflected by the convex portions and converged at the forward center area in the direction of light illumination, thereby forming a spot light beam.

This can increase the luminous intensity near the center of the light distribution pattern.

When the angle between each prism surface of the prism array and the surface of the light guide plate is set within the range of from 0 degrees to 45 degrees, the vertical range of emission light can be equal to an opening angle of approximately 70 degrees, i.e., the range between the light guide plate and the projection lens.

Accordingly, the light emitted from the light guide plate can reliably enter the projection lens to improve the incident efficiency from the projection lens, thereby forming a light distribution pattern of higher brightness.

The light emission surface of the light guide plate can have a shape corresponding to the desired cutoff pattern. In this case, the light source unit can form a cutoff pattern with ease. This can eliminate the need for a light shielding member configured to form such a cutoff pattern, thereby configuring the vehicle lamp with a simplified structure and lower costs.

When the end face on the light source side of the light guide plate is disposed on the cutoff pattern side, the bright-dark boundary of the cutoff line formed by the cutoff pattern can be close to the light source. This can provide high brightness as well as favorable light distribution pattern.

When the light guide plate is formed to correct the spherical aberration of the projection lens, the spherical aberration of the projection lens can be corrected thereby, to reduce the adverse effect of the spherical aberration. In an exemplary embodiment, the light guide plate can be curved to correct the spherical aberration of the projection lens. Furthermore, the adverse effect of the spherical aberration can be less than what is typically know, and the vehicle headlamp can employ a less expensive projection lens that can have a relatively large spherical aberration.

In one exemplary embodiment, an optical sheet can be configured so that the direction of the maximum luminous intensity of the light emitted from the light guide plate coincides with the direction of the optical axis of the projection lens. Alternatively, in another exemplary embodiment, the light guide plate can be disposed obliquely with respect to the optical axis of the projection lens by a predetermined angle so that the direction of the maximum luminous intensity of the light emitted from the light guide plate coincides with the direction of the optical axis of the projection lens. In these examples, the direction of reflected light with the maximum luminous intensity by the rear surface prism array of the light guide plate can be matched to the optical axis of the projection lens. This can increase the light amount entering the projection lens and can increase the luminous intensity of the illumination pattern.

When the light guide plate is disposed obliquely with respect to the optical axis of the projection lens by a predetermined angle, even with the relatively large light guide plate, the dimension can be reduced by an amount as a function of the inclination. This can make the brightness control element relatively high in resolution.

Furthermore, during the high beam traveling mode the high beam light source unit can be driven to emit light in addition to the light source unit. The light emitted from the high beam light source unit can pass through the projection lens to be projected forward in the optical axis direction, thereby forming another light distribution pattern just above the low beam light distribution pattern to entirely form a favorable high beam light distribution pattern.

In the vehicle lamp according to the presently disclosed subject matter, the projection lens can include convex lenses at both ends and a cylindrical lens formed therebetween. Furthermore, the high beam light source unit can be provided in an area corresponding to any of, or both of, the convex lenses. In this case, the light emitted from the high beam light source unit can enter the corresponding convex lens of the projection lens to be converged thereby. The resultant light can be projected as a spot light to form a brighter high beam light distribution pattern.

When the high beam light source unit can emit light with low intensity to form a day-time running light (DRL) distribution pattern in the direction of light illumination, the luminous intensity of light from the high beam light source unit can be adjusted to allow the entire vehicle lamp to operate as a day-time running light.

With the above-described simple structure, a vehicle lamp according to the presently disclosed subject matter can form a desired light distribution pattern easily and has a thin and light weight body. In addition to this, it is possible to provide the vehicle lamp that can be configured to project a high beam light distribution pattern.

BRIEF DESCRIPTION OF THE DRAWINGS

These and other characteristics, features, and advantages of the presently disclosed subject matter will become clear from the following description with reference to the accompanying drawings, wherein:

FIG. 8 is a schematic longitudinal cross-sectional view showing the configuration of a second exemplary embodiment of a vehicle headlamp made in accordance with principles of the presently disclosed subject matter;

DETAILED DESCRIPTION OF EXEMPLARY EMBODIMENTS

A description will now be made below to vehicle headlamps of the presently disclosed subject matter with reference to the accompanying drawings in accordance with exemplary embodiments.

Figure 1:
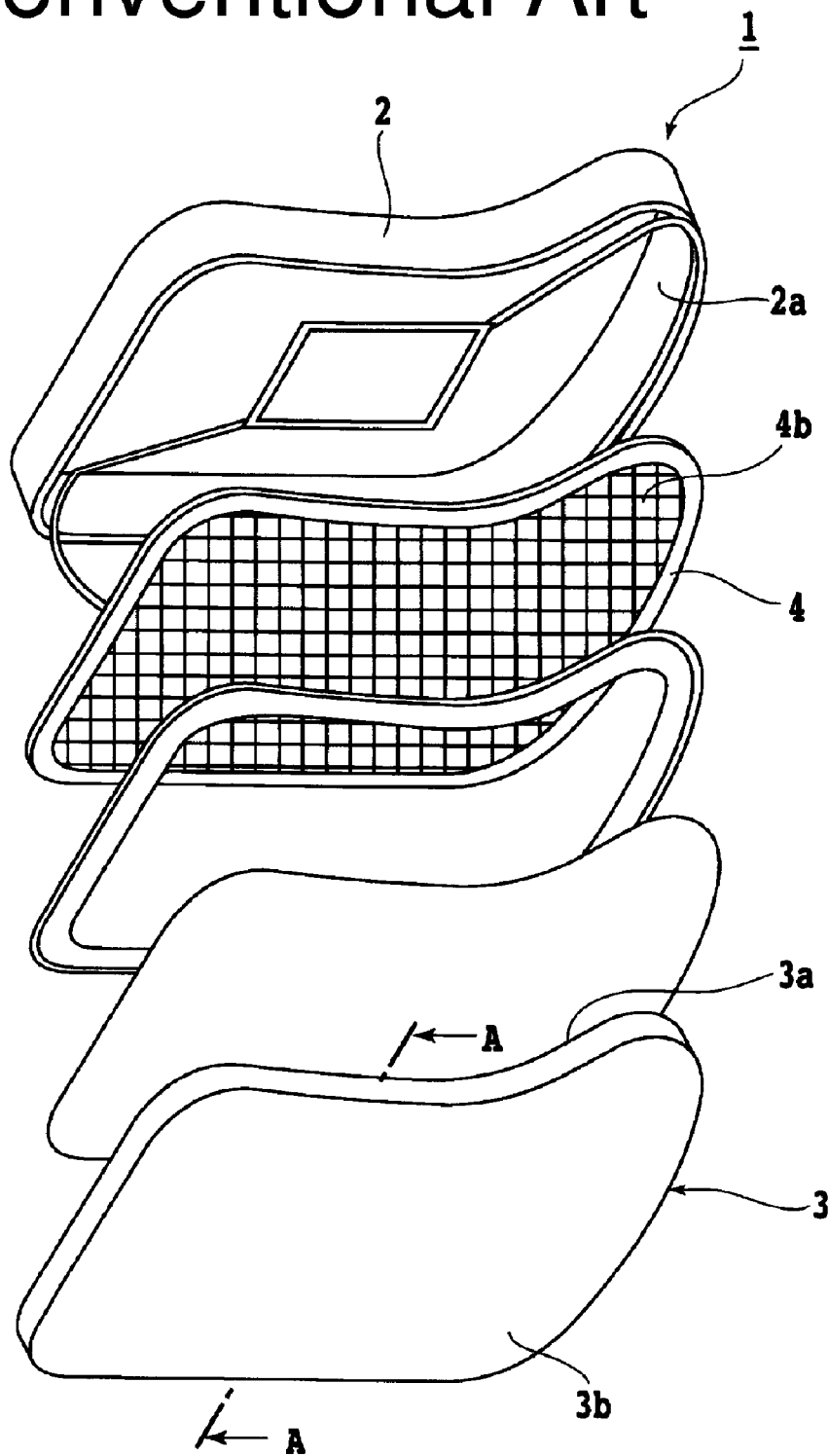
FIG. 1 is an exploded perspective view of a light source, showing an exemplary configuration of a conventional vehicle lamp.
Figure 2:
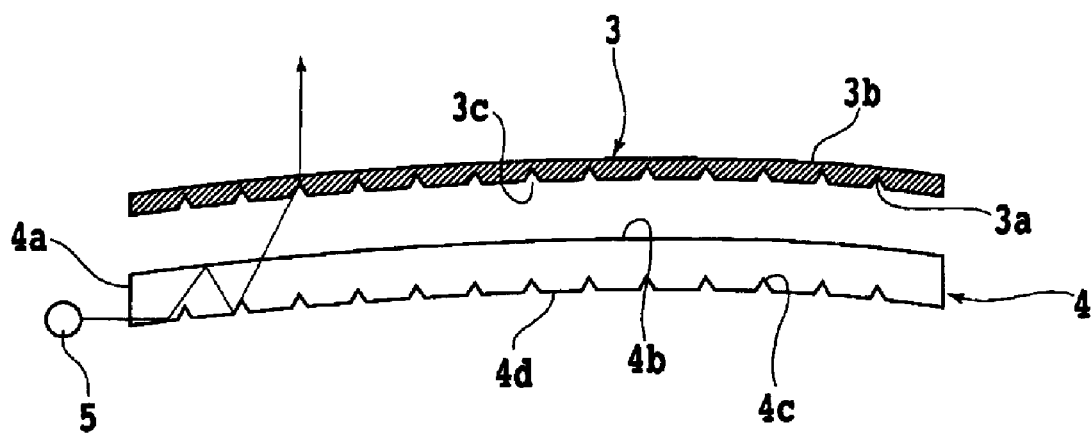
FIG. 2 is a partial cross-sectional view showing details of certain components of the vehicle lamp of FIG. 1.
Figure 3:
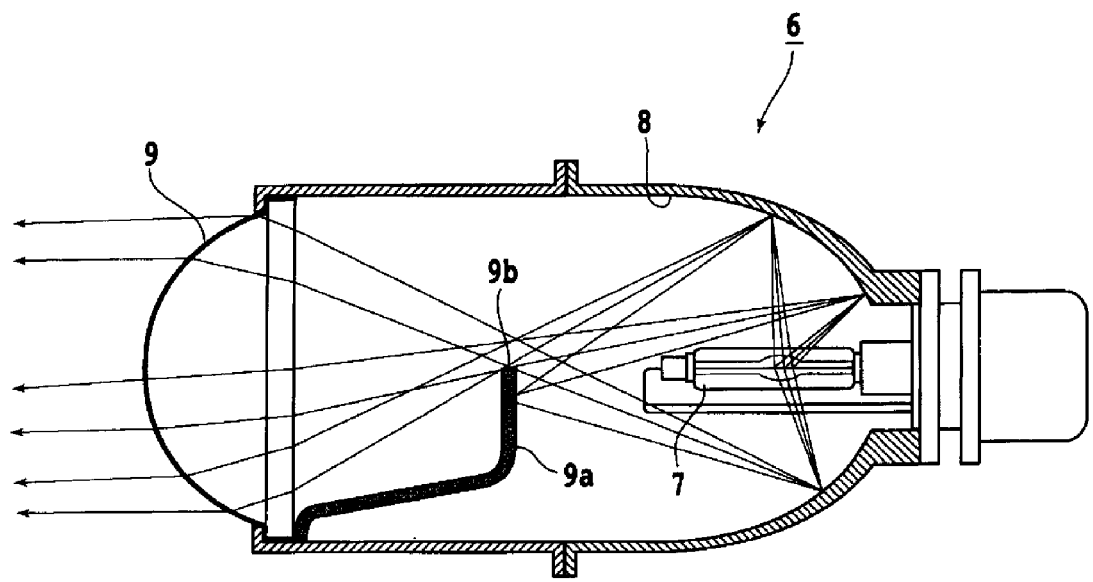
FIG. 3 is a schematic cross-sectional view showing an exemplary configuration of a conventional headlamp.
Figure 4:
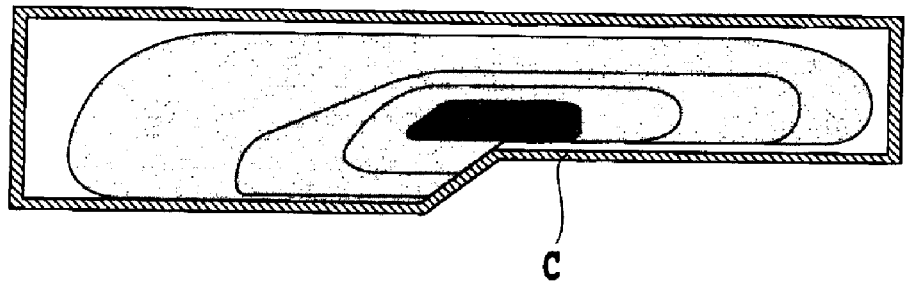
FIG. 4 is a graph showing a light distribution pattern formed by the headlamp of FIG. 3.
Figure 5:
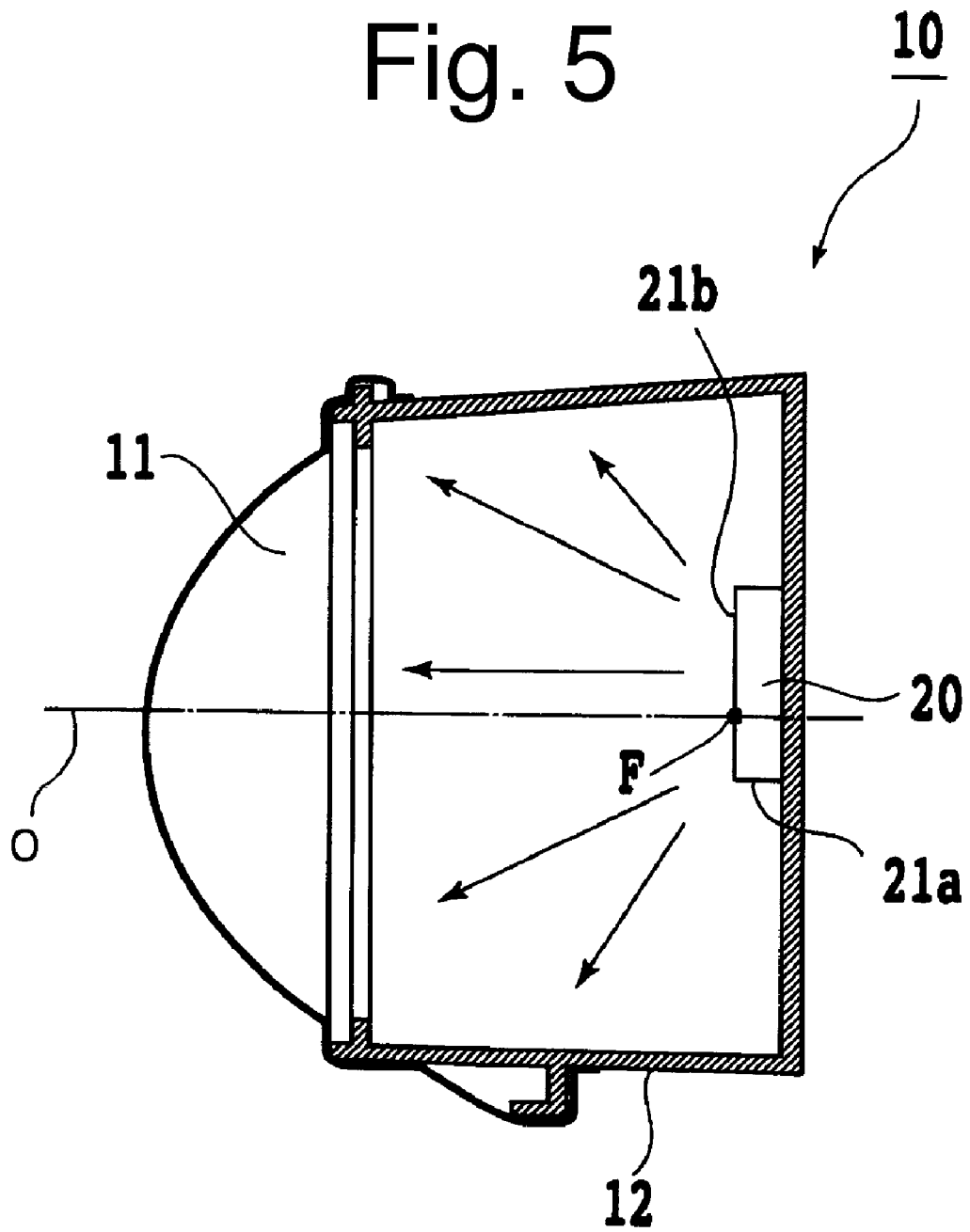
FIG. 5 is a schematic longitudinal cross-sectional view showing the configuration of a first exemplary embodiment of a vehicle headlamp made in accordance with principles of the presently disclosed subject matter.

FIG. 5 shows the configuration of a first exemplary embodiment of a vehicle headlamp made in accordance with principles of the presently disclosed subject matter.

In FIG. 5, the vehicle headlamp 10 can include a light source unit 20, and a projection lens 11 configured to converge light from the light source unit 20.

The configuration of the light source unit 20 will be described later. The light source unit 20 can be disposed near the center of the rear end of the box-shaped casing 12, which is opened to the front of the vehicle headlamp 10, so as to emit light forward in the direction of light illumination.

The projection lens 11 can be made of a convex lens, and is disposed so that its focal position F on the side of the light source unit 20 falls on the light emission surface of the light source unit 20. The focal position F can lie on the optical axis O.

Figure 6:
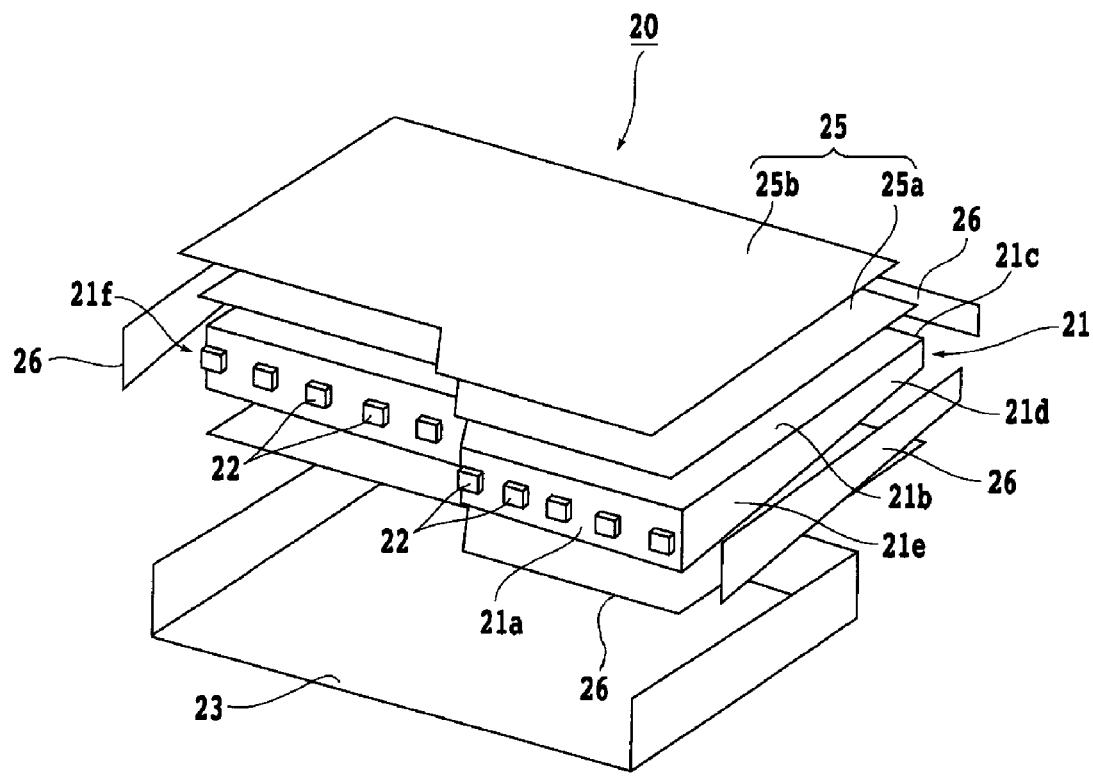
FIG. 6 is an enlarged, exploded perspective view showing a light source unit of the vehicle headlamp of FIG. 5.

As shown in FIG. 6, the light source unit 20 is composed of a light guide plate 21 and a plurality of LEDs 22 each serving as a light source.

In the shown case, the light guide plate 21 can be formed as a flat plate made of an optically transparent material, i.e., a material that is transparent to visible light.

For example, the above light guide plate 21 can be made of glass or a transparent resin that is commonly used for optical applications, such as polycarbonate or acrylic resin.

The light guide plate 21 can have an incident surface 21a at one end, or front end face in FIG. 6, and a light emission surface 21b at the top. The rear surface (bottom) and both the right and left sides can be covered with a casing 23 which is made of a lightproof material.

In the depicted embodiment, the light guide plate 21 can be shaped into a wedge-like section so that it gradually decreases in thickness from the foregoing incident surface 21a (light entering side) to the opposite end face (light projection side). However, the presently disclosed subject matter is not limited to this, and the light guide plate 21 can be formed with a constant thickness.

For improved incidence efficiency, the incident surface 21a of the light guide plate 21 can have a fine pattern consisting of, or comprising, rows of prismatic or circular configurations, for example. Alternatively, it may be given surface roughening.

The light emission surface 21b of the light guide plate 21 can have a prismatic or lenticular configuration for the purpose of providing enhanced brightness or well-ordered light distribution.

As shown in FIG. 6, the light emission surface 21b of the light guide plate 21 can also be shaped so as to correspond to the light distribution pattern to be projected, i.e., to a reduced inversion of this light distribution pattern. For example, the light emission surface 21b can be shaped to the cutoff pattern of a low beam of the vehicle headlamp.

For that purpose, the front end face 21a of the light guide plate 21 can be formed into a step near the center as shown in FIG. 6.

Figure 7A:
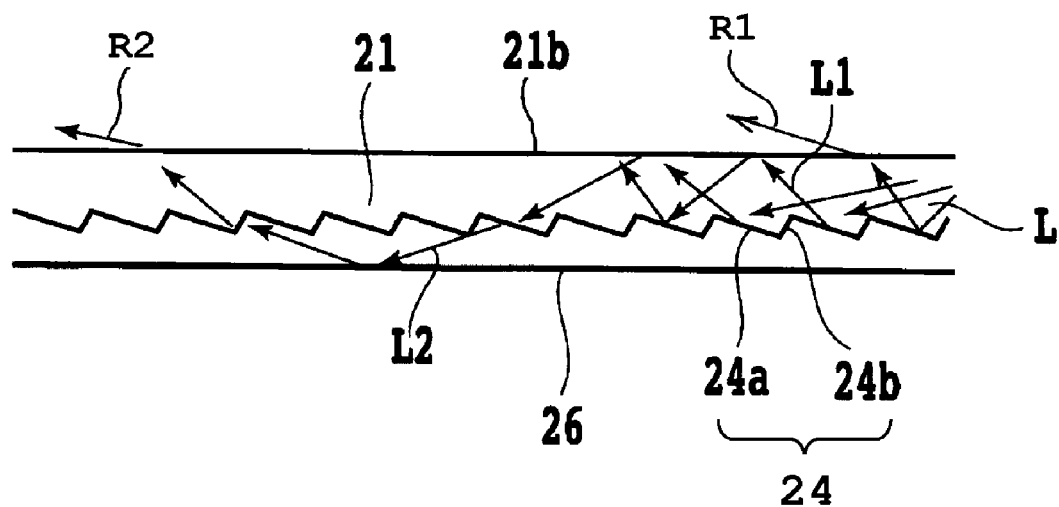
FIGS. 7A and 7B are each partial enlarged longitudinal cross-sectional views showing a light guide plate of the light source unit of FIG. 6.
Figure 7B:
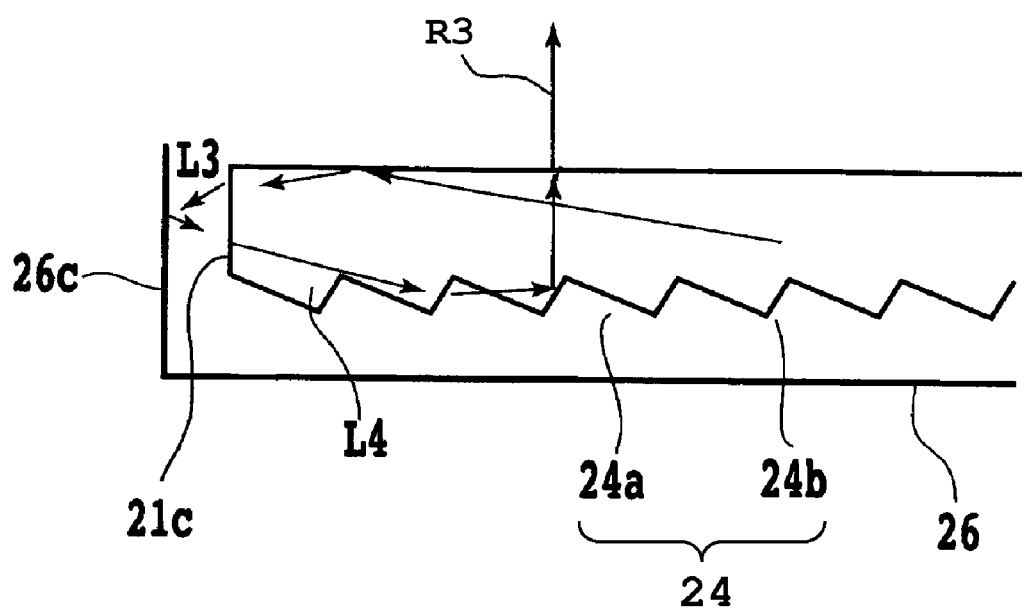

Furthermore, the light guide plate 21 can also have a prism array 24 on the rear surface (bottom) as shown in FIGS. 7A and 7B.

For example, this prism array 24 can be formed to extend with a serrated cross section from the incident surface 21a to the opposite end face, and in a corrugate configuration laterally.

The individual prism surfaces 24a of the prism array 24 can be obliquely formed so that when light enters the light guide plate 21 from the incident surface 21a and impinges on the prism surfaces 24a, the light is totally reflected into small angles of incidence to the emission surface.

Consequently, as shown in FIGS. 7A and 7B, a large portion of the light L that enters the light guide plate 21 can be reflected repeatedly, being totally reflected at the inner surfaces 24a of the prisms of the prism array 24 and being totally reflected at the top of the light guide plate 21.

This reflected light gradually decreases in the angle of incidence with respect to the light emission surface 21b of the light guide plate 21, and emerges as emission light R1 upward from the light emission surface 21b of the light guide plate 21 when the angle of incidence falls below the critical angle.

Some of the light L within the light guide plate 21 can be light L2 transmitting through the rear surface thereof because of the incident angle to the prism surface 24a being smaller than the critical angle. Even in this case, the transmitting light L2 to the rear surface can be reflected by the reflection sheet 26 back into the light guide plate. Accordingly, when the reflection sheet is made of a high reflectance material such as a silver reflection sheet or a formed resin sheet, the optical loss can be derived from a single source, such as the absorbance of the reflection sheet. Alternatively, the reflection sheet 26 can be configured as a reflecting film.

The light guide plate 21 can be manufactured by injection molding, press molding, or extrusion molding the above transparent resin material using a mold having a predetermined cavity shape. Alternatively, the light guide plate 21 can be manufactured by press molding of glass using a die having a predetermined cavity shape, or by using other known methods or materials.

Furthermore, the prism array 24 of the light guide plate 21 can be manufactured by processing a plate material produced by injection molding or extrusion molding of the above transparent resin material.

In order to enhance the brightness and/or adjust the light distribution characteristic of the light to be emitted from the surface, the light guide plate 21 may have an optical sheet or sheets 25 (in the case shown in FIG. 6, two optical sheets 25a and 25b) on the surface.

Through the optical effect of the optical sheets 25, the light emitted from the light emission surface 21b of the light guide plate 21 can be adjusted in direction and in directional characteristic appropriately, whereby the light emitted from the light guide plate 21 can be guided toward the projection lens 11 with reliability.

The directional characteristic of the light guide plate 21 can be set so that the emitted light can be directed within the opening angle range with respect to the projection lens 11.

Taking the diameter of the projection lens 11 into consideration, the opening angle can be set to about 70 degrees in general.

These optical sheets 25a and 25b may be prism sheets, diffusion films, or the like that are used in typical surface light source units.

The prism sheets can be manufactured by the following methods, including forming a film of a thermoplastic transparent resin, commonly used for optical applications, into the prismatic configuration by press molding or extrusion molding in a mold. Alternatively, they can be manufactured by forming a film made of an ultraviolet-curing transparent resin, commonly used for optical applications, into the prismatic configuration by using 2P or other molding techniques.

The diffusion films can be manufactured by the following methods, including extrusion molding a film of a thermoplastic transparent resin, commonly used for optical applications, and depositing resin or glass beads having a different refractive index on either one or both sides of the film. Alternatively, they can be manufactured by mixing a thermoplastic transparent resin, commonly used for optical application, with resin or glass beads having a different refractive index, and molding it into a film by extrusion molding or the like.

The light guide plate 21 can also have reflecting films 26 on the rear surface 21d. One feature of the reflecting films 26 can be the return of light that might leak out of the rear surface and lateral sides into the light guide plate 21, thereby improving the use efficiency of the light from the light source LEDs 22. If necessary, the reflecting films 26 can be disposed so as to be adjacent to or abutting the end face 21c opposite from the incident surface 21a, and both the right and left sides 21e and 21f of the light guide plate 21, respectively.

The reflecting films 26 can be made of a film of silver or other high-reflectance white sheets.

The high-reflectance white sheet can be manufactured by known methods, such as, employing: a high-reflectance metal film produced by depositing a film of silver, aluminum, or other high-reflectance metal on a surface of a extruded resin member by sputtering; a film or plate of polycarbonate resin or the like with a visible light diffusing and reflecting agent such as titanium oxide added thereto; or a resin film or resin plate that contains small pores dispersed by using a super-critical fluid, by micro foam molding, by foam molding with the aid of chemical foaming agents, and the like.

When the inner surfaces of the casing 23 are formed as reflecting surfaces, at least part of the inner surfaces of this casing 23 can be utilized for the reflecting films 26.

For example, in order to make the inner surfaces of the casing 23 into reflecting surfaces, a thin film of high-reflectivity metal can be deposited on the inner surfaces of the resin or metal casing 23 directly by vacuum deposition or sputtering.

The LEDs 22 can be opposed to the incident surface 21a of the light guide plate 21 in a row.

The LEDs 22 need not be arranged at regular intervals, but are arranged at appropriate intervals along the incident surface 21a of the light guide plate 21 so that the light emission surface 21b of the light guide plate 21 can provide a predetermined brightness distribution.

While the LEDs 22 can be arranged in a single row in the shown example, they are not limited to this arrangement but can be arranged in a plurality of rows.

Furthermore, the LEDs 22 each can be an LED package composed of a single or a plurality of LED chip(s).

The vehicle headlamp 10 of the present exemplary embodiment is configured as described above, and a drive voltage is applied to the LEDs 22 of the light source unit 20 from a not-shown external drive circuit. The LEDs 22 can be thereby driven to emit light.

The light emitted from the LEDs 22 can enter the light guide plate 21 through the incident surface 21a. The light can be reflected at the surface, rear surface, and both lateral sides of this light guide plate 21 and returned into the light guide plate by the reflecting sheets 26 repeatedly before emitted toward the projection lens 11 from the emission surface 21b as light beams R1 and R2 (see FIG. 7A). Then, the remaining light L3 can travel to the opposite end face 21c to be emitted therefrom (see FIG. 7B).

The light L3 from the end face 21c can be reflected by the reflection sheet 26c to be back into the light guide plate 21. The returned light L4 can be adjusted between the prism surface 24a and the tapered surface 24b of the prism array 24 so that the angle of incidence to the taper surface 24b becomes large. When the angle of incidence to the taper surface 24b exceeds the critical angle, the light can be totally reflected to be projected as light R3 from the light emission surface 21b, whereby the light emission surface 21 can emit light with high brightness.

The emission shape on the light emission surface 21b of this light guide plate 21 can be projected forward in the direction of light illumination through the projection lens 11.

The emission shape on this light emission surface 21b can be magnified and inverted when projected forward in the direction of light illumination.

As shown in FIG. 6, the light emission surface (top surface) 21b of the light guide plate 21 can be shaped to form the cutoff pattern at the edge on the side of the incident surface 21a. This can create the emission shape corresponding to the light distribution pattern that is suitable for the low beam of the vehicle headlamp.

Accordingly, this emission shape can be projected forward in the direction of light illumination through the projection lens 11, whereby the light distribution pattern suitable for the low beam of the vehicle is formed.

In this instance, the light emission surface 21b of the light guide plate 21 in the light source unit 20 can have the emission shape corresponding to the light distribution pattern. This can eliminate the need for a reflecting surface configured to create a light distribution pattern or a light shielding member configured to form the cutoff line as in vehicle headlamps of a conventional projector type.

Consequently, the entire vehicle headlamp 10 is significantly reduced in length in the front-to-rear direction, so that it can be configured with a smaller size and lighter weight.

The absence of need for the light shielding member can contribute to a small parts count, with a significant reduction in parts cost and assembly cost.

The light emission surface 21b of the light guide plate 21 can be shaped to the cutoff pattern at the side of the incident surface 21a. This makes it possible for the light emission surface 21b to provide high brightness at the side of the incident surface 21a easily.

As a result, the cutoff line or bright-dark boundary of the light distribution pattern formed on the side of this incident surface 21a can be projected clearly with high brightness.

The LEDs 22 can be arranged at smaller intervals in the area where higher brightness is desired in the light distribution pattern. This can facilitate providing high brightness.

FIG. 8 shows the configuration of the vehicle headlamp according to a second exemplary embodiment of the presently disclosed subject matter.

In FIG. 8, the vehicle headlamp 30 can have the same configuration as that of the vehicle headlamp 10 shown in FIG. 5. The same or similar components will thus be designated with the same reference numerals and the descriptions thereof will be omitted here. In addition to this, some components which are the same or similar components as those in the previous exemplary embodiment are omitted in the drawings for facilitating the understanding of the presently subject matter.

One difference in the vehicle headlamp 30 can be the arrangement of the light source unit 20 configured obliquely with respect to the optical axis of the projection lens 11.

The light source unit 20 of the present exemplary embodiment can be obliquely arranged so that the reflected light created by the prism array 24 of the source plate 21 is emitted in the direction coincident with the optical axis of the projection lens 11. In this case, the light source unit 20 can be inclined with the top edge forward.

The light source unit 20 can be situated so that the focal position of the projection lens 11 on the side of the light source unit 20 comes near the position where the incident surface 21a of the light guide plate 21 forms a cutoff line.

In general, light emitted from the light source unit 20, but not entering the projection lens 11, might not contribute to the formation of the light distribution pattern. Accordingly, the light utilization efficiency from the light source unit 20 can be lowered.

In view of this, the directional characteristic of the light source unit 20, or that of the light guide plate 21, can be set so that the emitted light from the light guide plate 21 is directed within the angle range (opening angle range) between the light guide plate 21 and the projection lens 11. Taking the diameter of the projection lens 11 into consideration, the opening angle can be set to about 70 degrees in general.

In the above light guide plate 21, the prism angle of the prism array 24 (inclination angle of the prism inner surface facing to the light incident surface 12a) and the directional characteristic of the emitted light can be related to each other. Computational simulation has been performed on the vertical directional characteristic of the light guide plate 21 while varying the prism angle of from 2 degrees to 45 degrees, and the results shown in the graph of FIG. 9 were obtained.

Figure 9:
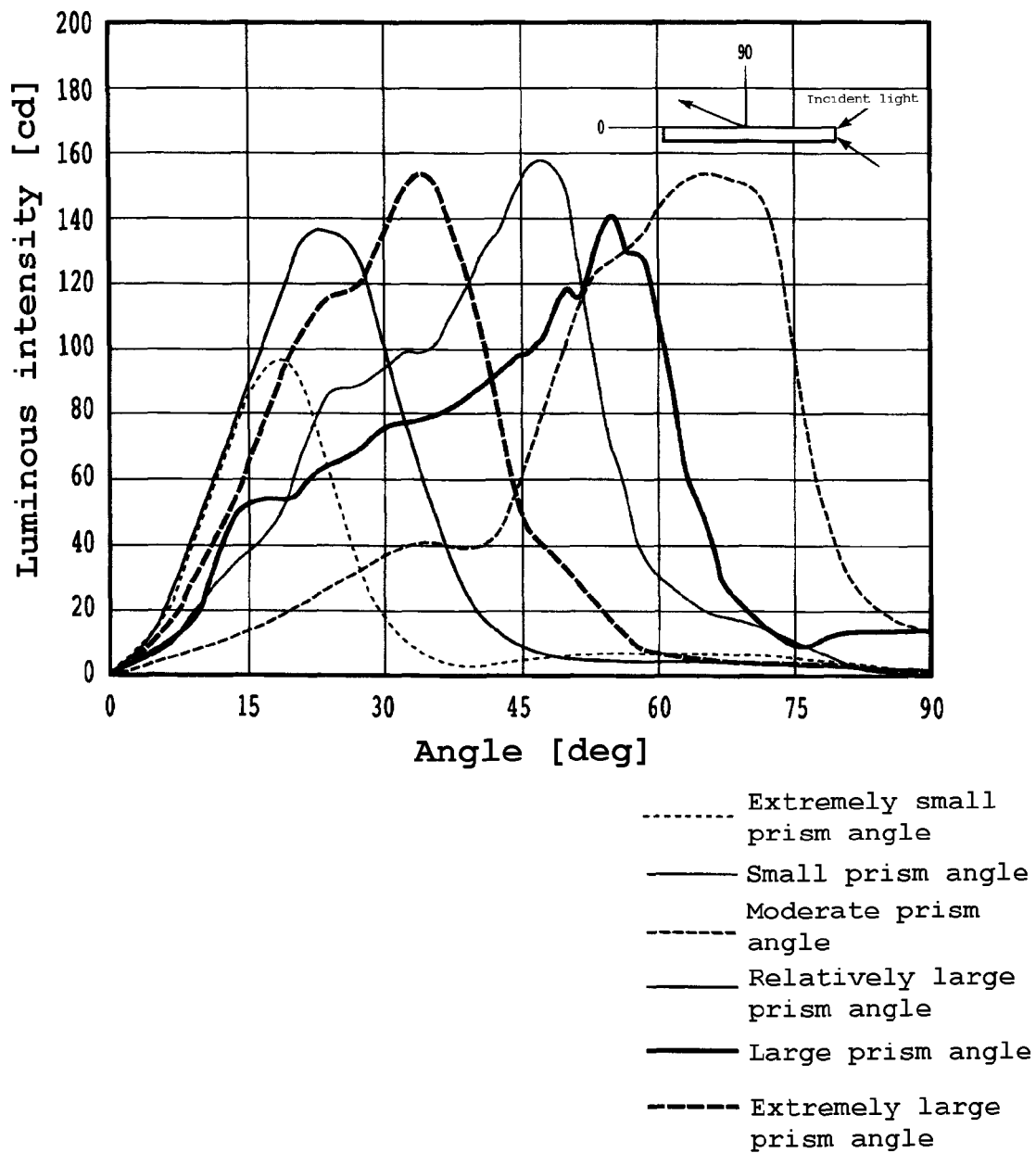
FIG. 9 is a graph showing a vertical directional characteristic of the light guide plate of the light source unit of FIG. 6, with respect to a prism angle.

As shown in FIG. 9, the smaller the prism angle is, the narrower the directional characteristic can be. The larger the prism angle is, the wider the directional characteristic can be, and the direction of the maximum luminous intensity of the light emitted from the light guide plate can vary.

Accordingly, the vehicle headlamp 10 shown in FIG. 5 can use an optical sheet 25 configured to guide the light from the light source unit 20 to the projection lens 11. Alternatively, the light emission surface 21b of the light guide plate 21 can be processed to have a prism having a desired prism angle of, for example, 60 to 110 degrees, extending laterally. This can adjust the directional characteristic to coincide with the direction to the projection lens. However, alternatively the light source unit 20 of the vehicle headlamp 30 of FIG. 8 can be obliquely disposed with respect to the optical axis of the projection lens 21 so as to allow the emission light to be directed to the projection lens.

Figure 10A:
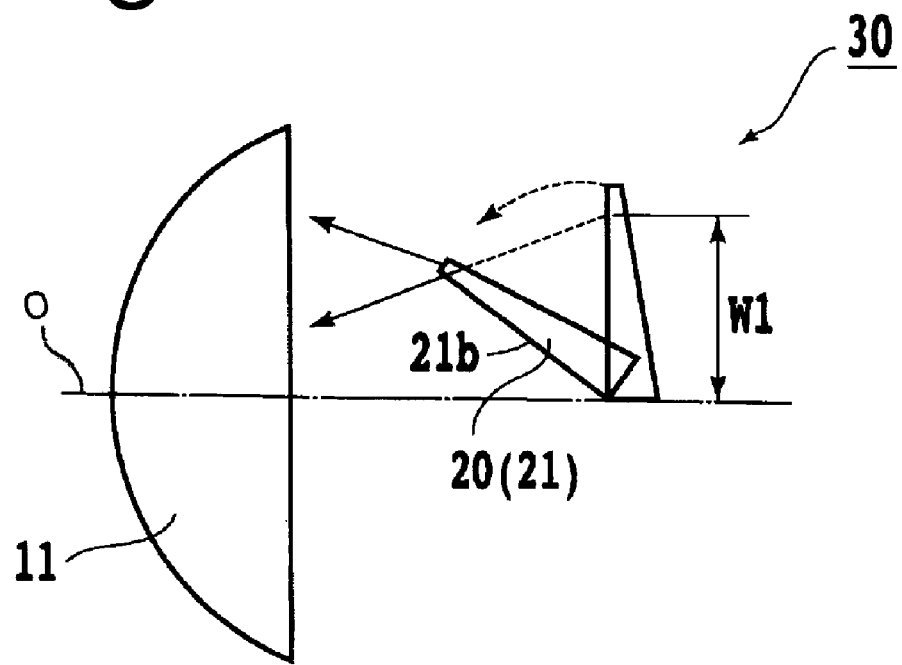
FIGS. 10A and 10B are schematic cross-sectional views illustrating the light source unit of the vehicle headlamp of FIG. 8 being arranged obliquely, FIG. 10A being a case when the light guide plate has a narrow directional characteristic and FIG. 10B being a case when the light guide plate has a wide directional characteristic.

The above configuration can be suitable when the directional characteristic of the light guide plate 21 is narrow. The apparent vertical width W1 of the light guide plate 21 can be reduced, as shown in FIG. 10A, by disposing the light source unit 20 obliquely. In addition to this, the light guide plate 21 can be more close to the projection lens. This can ensure the entrance of the emission light from the light guide plate 21 into the projection lens 11, thereby improving the light utilization efficiency. The decrease in apparent vertical width W1 can facilitate the formation of vertically narrower light distribution pattern with ease, which would be suitable for the headlamp or fog lamp use.

Figure 10B:
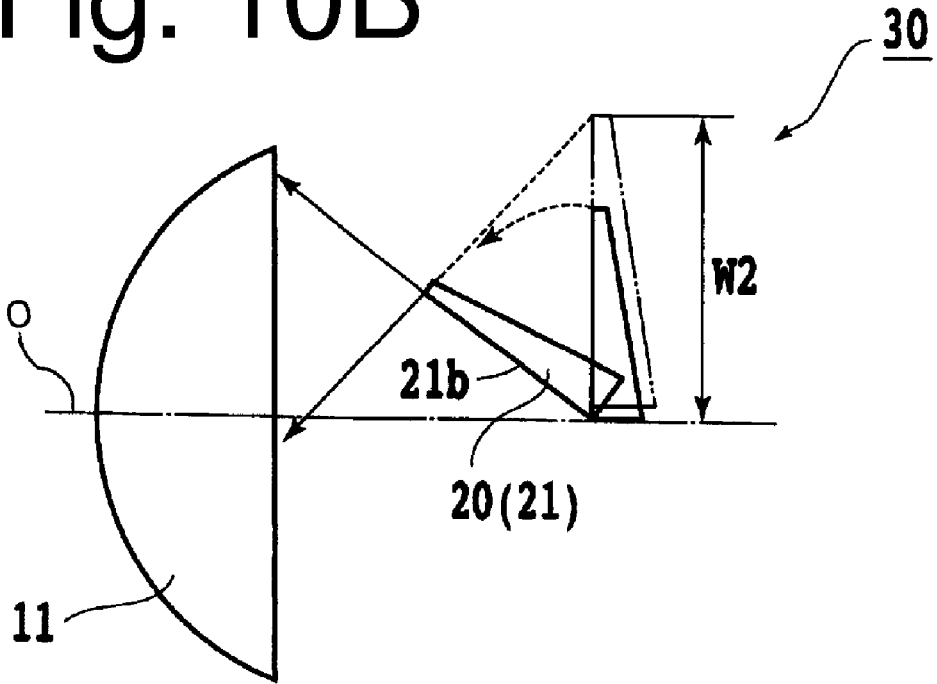

On the other hand, when the directional characteristic is wide, as shown in FIG. 10B, the apparent vertical width W2 can be large. In this case, the configuration of the first exemplary embodiment can be employed.

In this vehicle headlamp 30 configured as above, like the vehicle headlamp 10, a relatively expensive optical sheet 25 needs not be used. This can reduce the overall cost.

In addition to this, since the light source unit 20 can be obliquely disposed, the light guide plate 21 can be disposed closer to the projection lens. This can improve the incidence efficiency to the projection lens 11.

Furthermore, since the light source unit 20 can be obliquely disposed, it can occupy a smaller inner space of the casing 23. This means that a larger light guide plate 21 can be employed with the same occupied height. Accordingly, the apparent vertical width of the light guide plate 21 can be reduced and a vertically narrower light distribution pattern can easily be obtained.

Figure 11A:
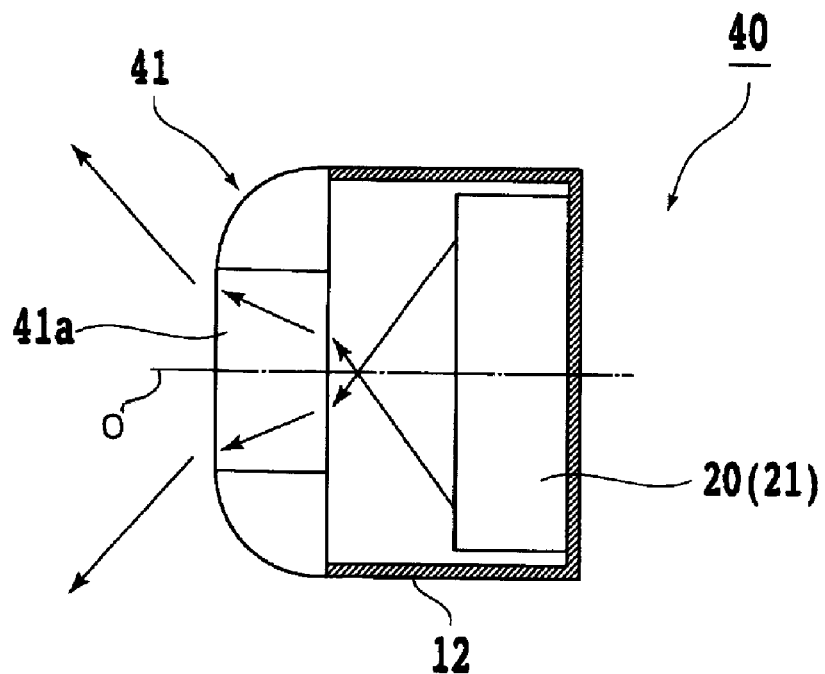
FIGS. 11A and 11B are a schematic cross-sectional view and a schematic longitudinal cross-sectional view, respectively, showing the configuration of a third exemplary embodiment of a vehicle headlamp made in accordance with principles of the presently disclosed subject matter.
Figure 11B:
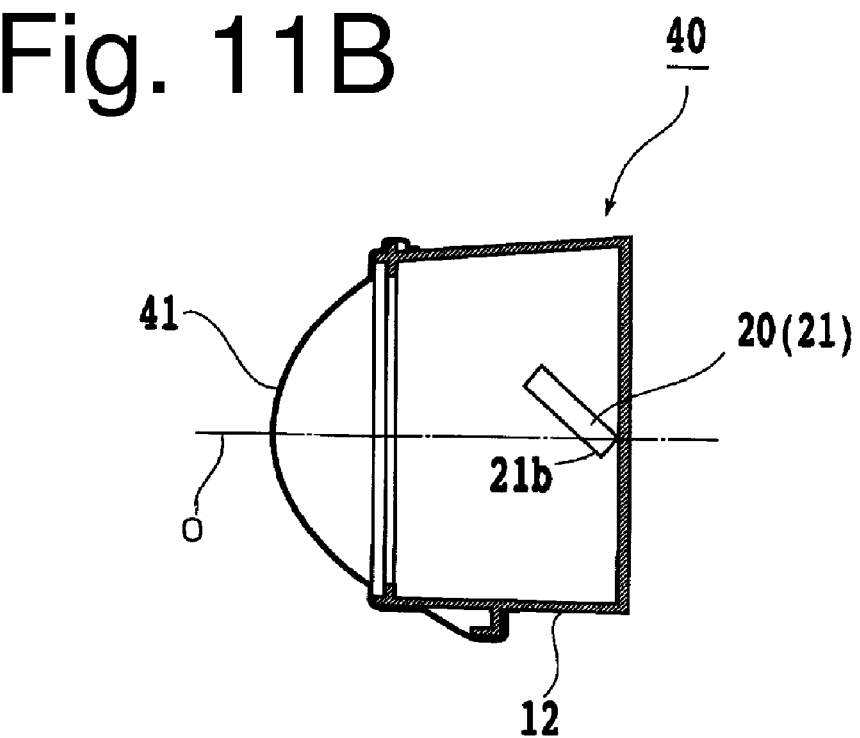

FIGS. 11A and 11B show the configuration of a vehicle headlamp according to a third exemplary embodiment of the presently disclosed subject matter.

In FIGS. 11A and 11B, the vehicle headlamp 40 can have the same configuration as that of the vehicle headlamp 30 shown in FIG. 8. The same or similar components will thus be designated with the same reference numerals and the descriptions thereof will be omitted here. In addition to this, some components which are the same or similar components as those in the previous exemplary embodiments are omitted in the drawings for facilitating the understanding of the presently subject matter.

One difference in the vehicle headlamp 40 can be the provision of the laterally long projection lens 41 corresponding to the laterally long light source unit 20.

The projection lens 41 can include two lenses and a cylindrical lens 41a. The lenses can be formed by splitting the foregoing projection lens 11, i.e., a convex lens into two at the center, and are separated from each other according to the lateral length of the light guide plate 21. The cylindrical lens 41a can connect these two convex lenses.

The vehicle headlamp 40 having such a configuration can provide the same operation as that of the vehicle headlamp 30 shown in FIG. 8.

The projection lens 41 can include the cylindrical lens 41a with a laterally-oblong incident surface. This can improve the incidence efficiency onto the projection lens from the light guide plate 21.

Figure 12:
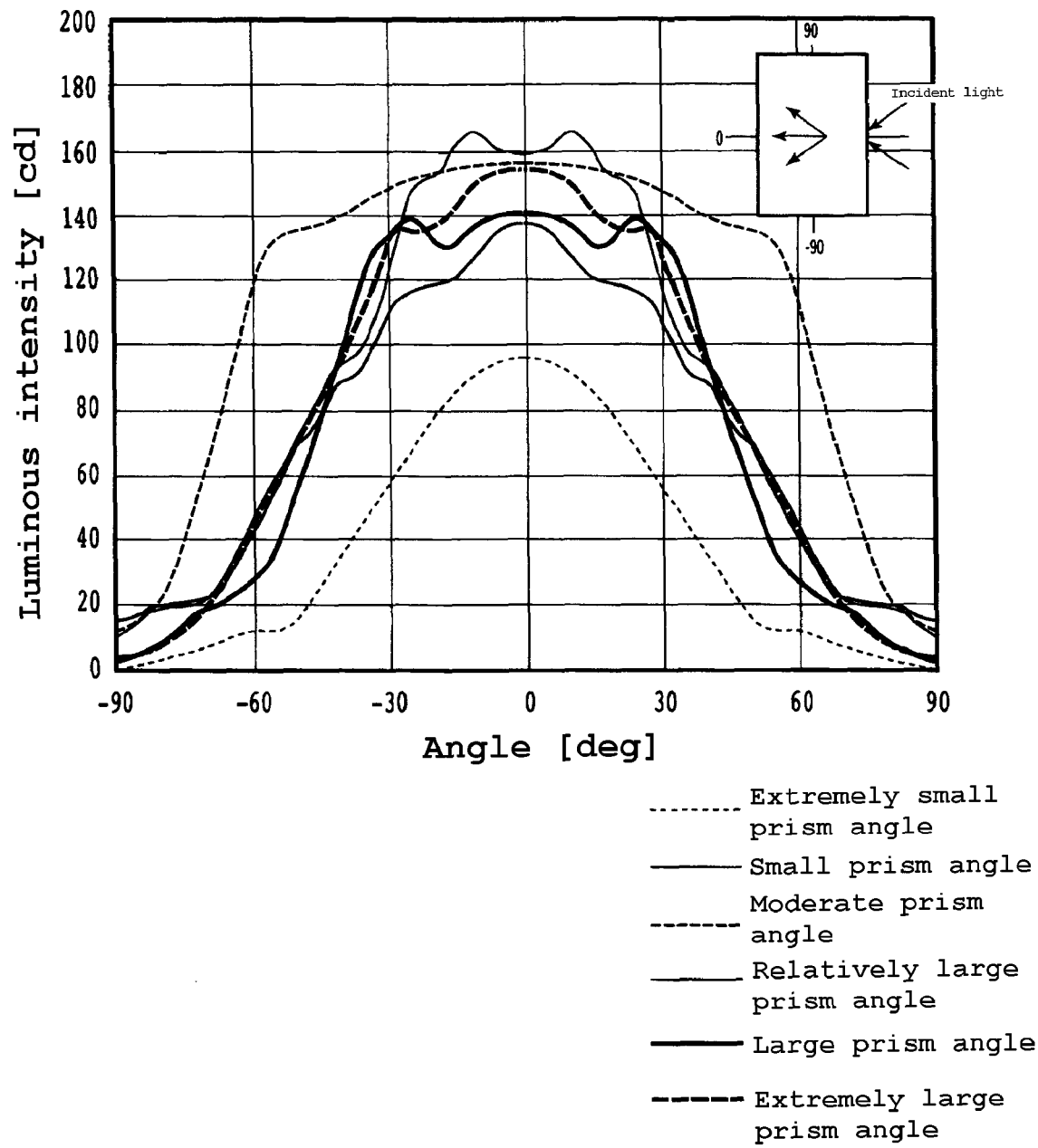
FIG. 12 is a graph showing a horizontal directional characteristic of the light guide plate of the light source unit of FIG. 6, with respect to a prism angle.

FIG. 12 shows the results of the computational simulation on the horizontal directional characteristic of the light guide plate 21 while varying the prism angle of 2 to 45 degrees. As shown in FIG. 12, the prism array 24 can be oriented parallel to the light incident surface 21a, and accordingly, it can lack light-gathering capability with respect to the lateral direction. Namely, since the light guide plate 21 can emit light expanded horizontally, the laterally wide cylindrical lens 21a can be effectively utilized for enhancing the incident efficiency to the projection lens from the light guide plate 21.

The light entering the cylindrical lens 41a can be expanded horizontally as shown in FIG. 11A, forming a horizontally wide light distribution pattern. This can reduce brightness variations between light source LEDs in the light distribution pattern. The light entering the convex lenses at the respective ends of the projection lens 41 can be refracted to the inside in the horizontal direction and projected forward in the direction of light illumination. This can enhance the luminous intensity at and near the center of the light distribution pattern.

Figure 13A:
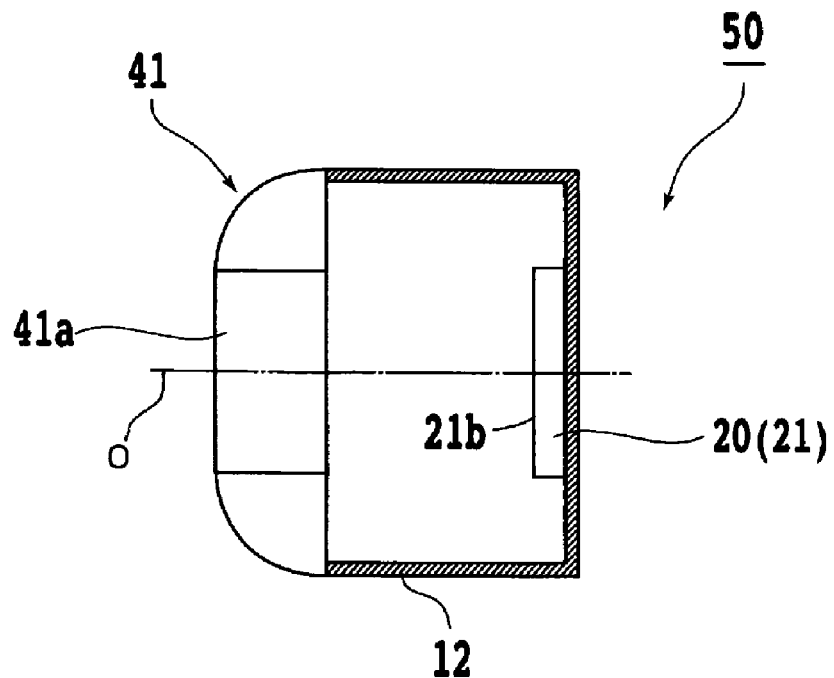
FIGS. 13A and 13B are a schematic cross-sectional view and a schematic longitudinal cross-sectional view, respectively, showing the configuration of a fourth exemplary embodiment of a vehicle headlamp made in accordance with principles of the presently disclosed subject matter.
Figure 13B:
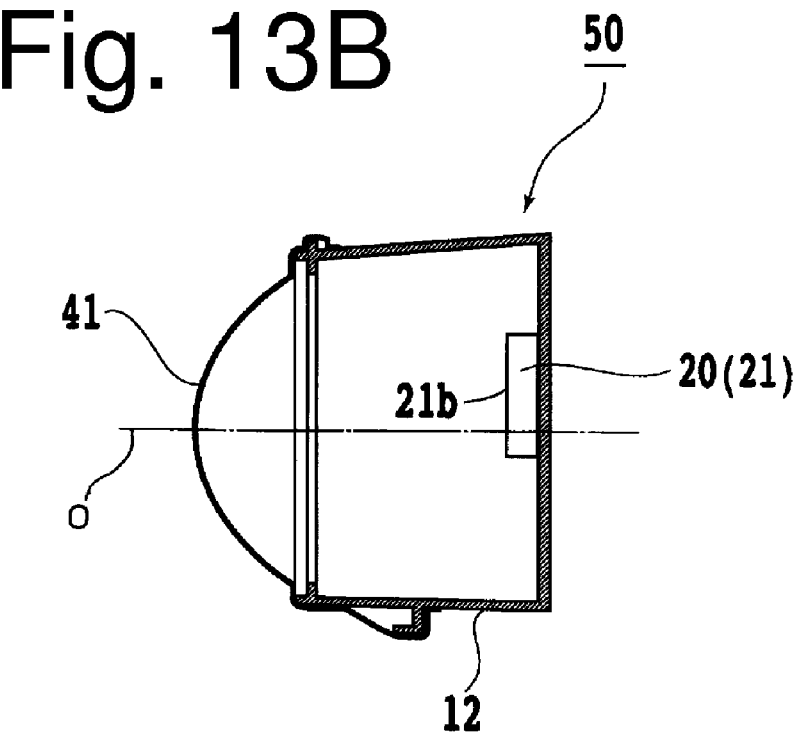

FIGS. 13A and 13B show the configuration of the vehicle headlamp according to a fourth exemplary embodiment of the presently disclosed subject matter.

In FIGS. 13A and 13B, the vehicle headlamp 50 can have the same configuration as that of the vehicle headlamp 40 shown in FIG. 11. The same or similar components will thus be designated with the same reference numerals and the descriptions thereof will be omitted here. In addition to this, some components which are the same or similar components as those in the previous exemplary embodiments are omitted in the drawings for facilitating the understanding of the presently subject matter.

One difference in the vehicle headlamp 50 can be, when compared with the vehicle headlamp 40 of FIG. 11, the vertical arrangement of the light source unit 20.

The vehicle headlamp 50 having such a configuration can provide the same operation as that of the vehicle headlamp 40 shown in FIGS. 11A and 11B. In addition to this, the light emitted from the light emission surface 21b of the light guide plate 21 of the light source unit 20 can have an adjusted directional characteristic by the optical sheet 25, thereby entering the projection lens 41.

Figure 14A:
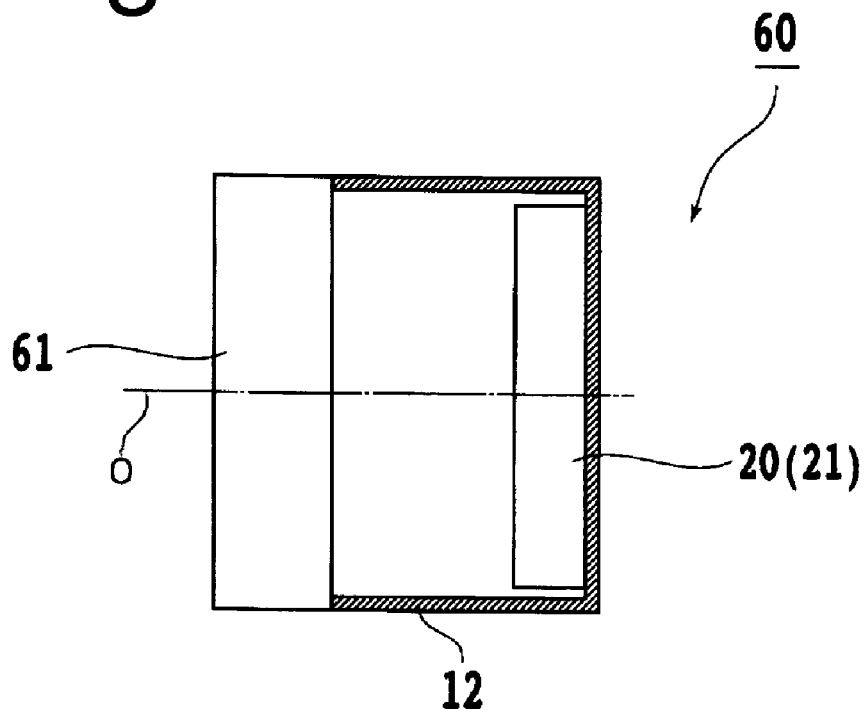
FIGS. 14A and 14B are a schematic cross-sectional view and a schematic longitudinal cross-sectional view, respectively, showing the configuration of a fifth exemplary embodiment of a vehicle headlamp made in accordance with principles of the presently disclosed subject matter.
Figure 14B:
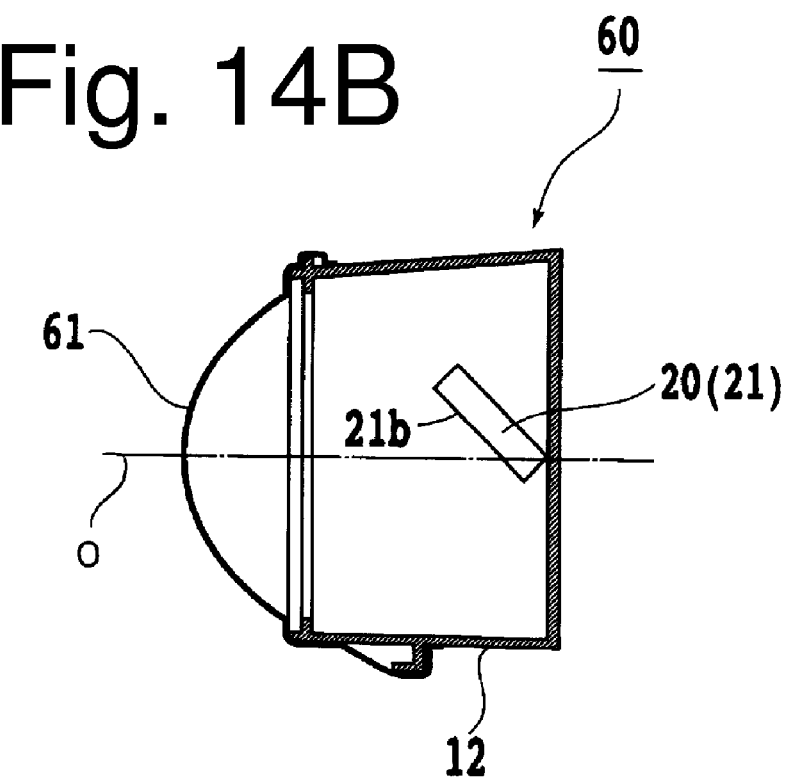

FIGS. 14A and 14B show the configuration of the vehicle headlamp according to a fifth exemplary embodiment of the presently disclosed subject matter.

In FIGS. 14A and 14B, the vehicle headlamp 60 can have the same configuration as that of the vehicle headlamp 40 shown in FIGS. 11A and 11B. The same or similar components will thus be designated with the same reference numerals and the descriptions thereof will be omitted here. In addition to this, some components which are the same or similar components as those in the previous exemplary embodiments are omitted in the drawings for facilitating the understanding of the presently disclosed subject matter.

The difference in the vehicle headlamp 60 can be, when compared with the vehicle headlamp 40 of FIGS. 11A and 11B, the provision of the projection lens 61 in place of the projection lens 41. The projection lens 61 can include a single element, such as a cylindrical lens having an axis extending horizontally.

The vehicle headlamp 60 having such a configuration can provide the same operation as that of the vehicle headlamp 40 shown in FIGS. 11A and 11B.

The projection lens 61 has no convex lens near either right or left end. Accordingly, the light emitted laterally from the light guide plate 21 is not converged to near the center of the light distribution pattern, but is reflected by internal reflection, contributing to the formation of the light distribution pattern.

This makes it possible to provide a desired light distribution pattern for a fog lamp and the like where the maximum luminous intensity is not of particular significance.

Figure 15A:
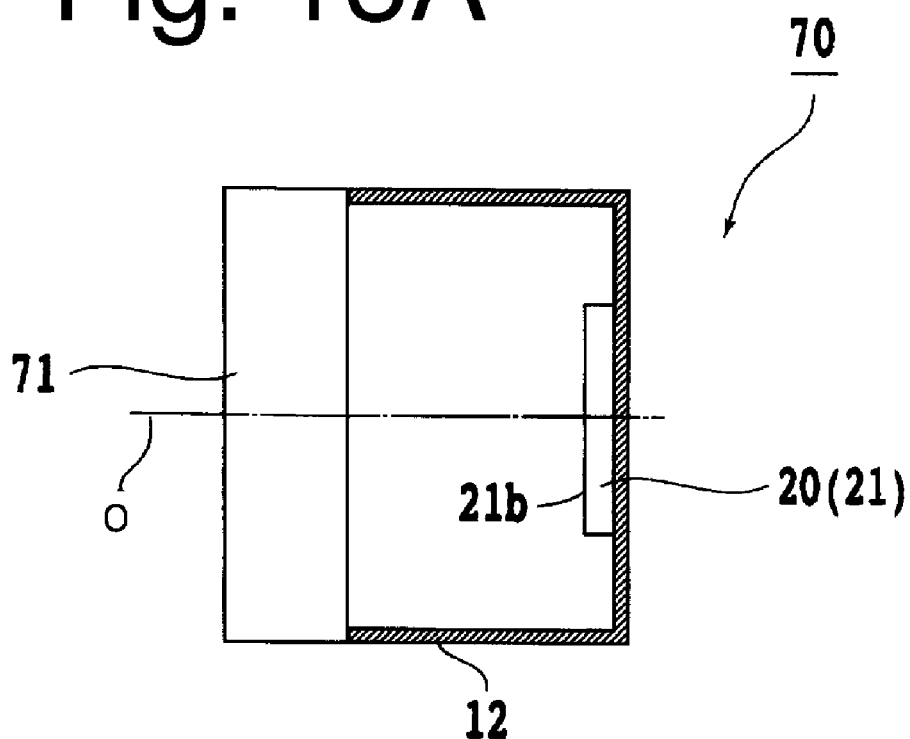
FIGS. 15A and 15B are a schematic cross-sectional view and a schematic longitudinal cross-sectional view, respectively, showing the configuration of a sixth exemplary embodiment of a vehicle headlamp made in accordance with principles of the presently disclosed subject matter.
Figure 15B:
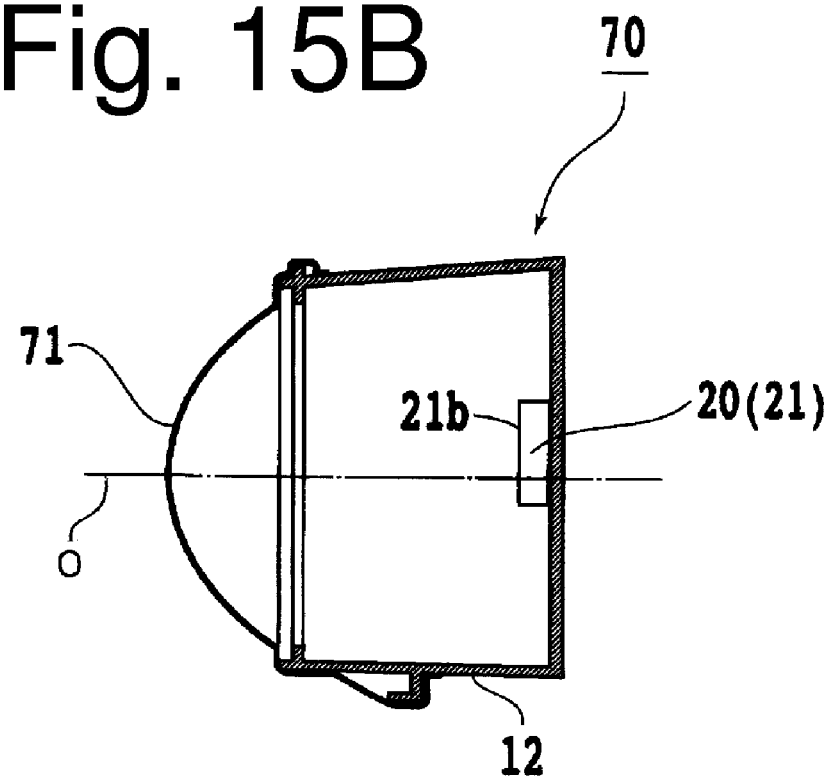

FIGS. 15A and 15B show the configuration of the vehicle headlamp according to a sixth exemplary embodiment of the presently disclosed subject matter.

In FIGS. 15A and 15B, the vehicle headlamp 70 can have the same configuration as that of the vehicle headlamp 60 shown in FIGS. 14A and 14B. The same or similar components will thus be designated with the same numerals and the descriptions thereof will be omitted here. In addition to this, some components which are the same or similar components as those in the previous exemplary embodiments are omitted in the drawings for facilitating the understanding of the presently subject matter.

One difference in the vehicle headlamp 70 can be, when compared with the vehicle headlamp 60 of FIGS. 14A and 14B, the vertical arrangement of the light source unit 20.

The vehicle headlamp 70 having such a configuration can provide the same or similar operation as that of the vehicle headlamp 60 shown in FIGS. 14A and 14B. In addition to this, the light emitted from the light emission surface 21b of the light guide plate 21 of the light source unit 20 can have an adjusted directional characteristic by the optical sheet 25, thereby entering the projection lens 71.

Figure 16:
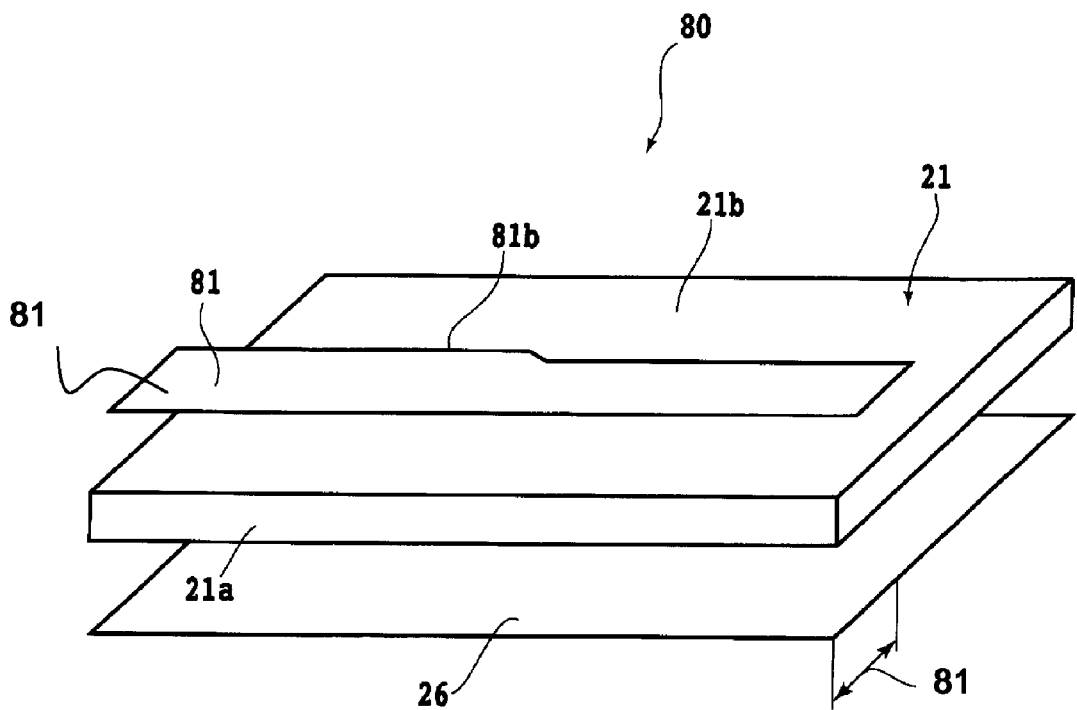
FIG. 16 is a schematic perspective view showing the configuration of a light source unit in a seventh exemplary embodiment of a vehicle headlamp made in accordance with principles of the presently disclosed subject matter.

FIG. 16 shows the configuration of the vehicle headlamp according to a seventh exemplary embodiment of the presently disclosed subject matter.

In FIG. 16, the vehicle headlamp can have the same configuration as those of the vehicle headlamps shown in FIGS. 5, 8, 14A and 14B, and 15A and 15B. One difference in the vehicle headlamp can be the provision of the light source unit 80 in place of the light source unit 20.

When compared with the light source unit 20 of FIG. 6, the light emission surface 21b of the light source unit 80 does not have a shape corresponding to the cutoff pattern, but has a light guide part 81g with a predetermined width provided in the edge area on the side of the light incident surface 21a.

This light guide part 81g can be formed by a reflection sheet 81a which is placed on the surface of the light guide plate 21 in that area.

The reflection sheet 81a can have an edge 81b opposite to the light incident surface 21a, and the edge can be formed to have a shape corresponding to the cutoff line.

In the light source unit 80 of the vehicle headlamp with this configuration, the light entering the light guide plate 21 via the light incident surface 21a can be repeatedly reflected by the light guide part 81 between the reflection sheet 81a and the rear surface of the light guide plate 21 or the reflection film 26, specifically, between portion 81g of the reflection film 26 (which corresponds to the width of the light guide part 81) and the light guide part 81g. In this manner, the incident light can be sufficiently diffused, in particular, in the horizontal directions inside the light guide plate 21. This can reduce the brightness variations ascribable to distances between the LEDs 22, and a desired cutoff pattern can be formed by the outline of the edge 81b of the reflection sheet 81a with ease.

Figure 17A:
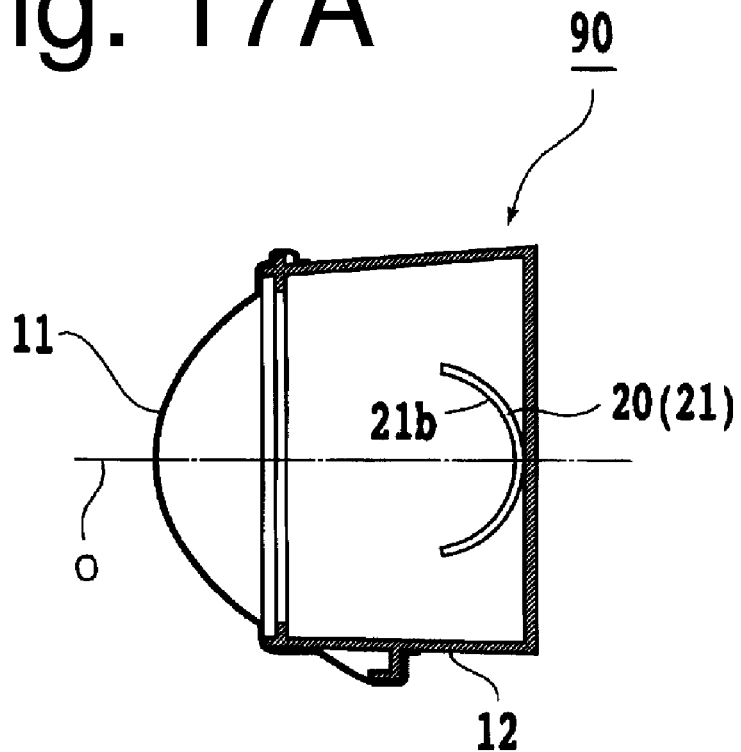
FIGS. 17A and 17B are a schematic cross-sectional view and a schematic longitudinal cross-sectional view, respectively, showing the configuration of an eighth exemplary embodiment of a vehicle headlamp made in accordance with principles of the presently disclosed subject matter.
Figure 17B:
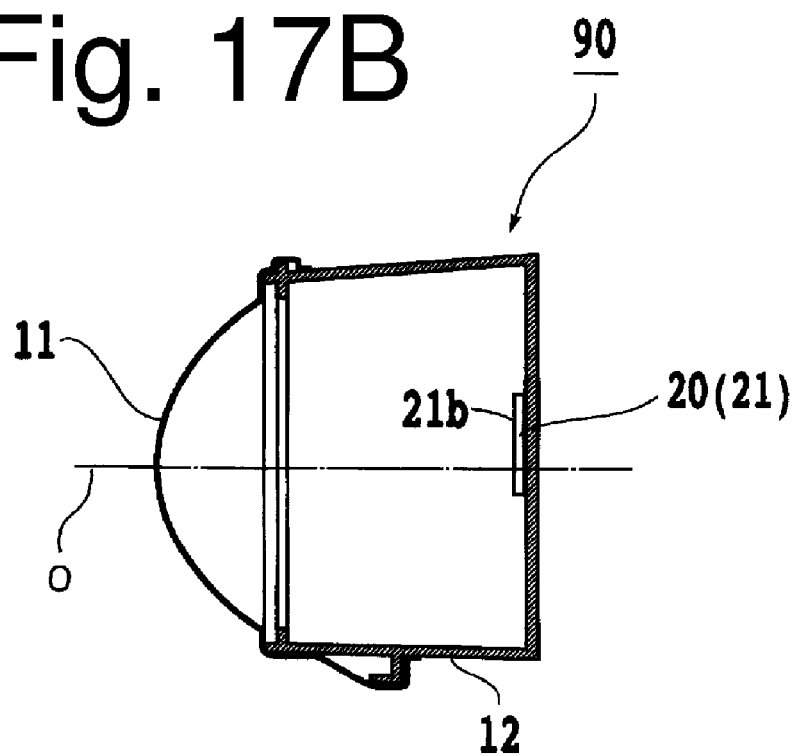

FIGS. 17A and 17B show the configuration of the vehicle headlamp according to an eighth exemplary embodiment of the presently disclosed subject matter.

In FIGS. 17A and 17B, the vehicle headlamp 90 can have the same configuration as that of the vehicle headlamp 10 shown in FIG. 5. The same or similar components will thus be designated with the same reference numerals and the descriptions thereof will be omitted here. In addition to this, some components which are the same or similar components as those in the previous exemplary embodiments are omitted in the drawings for facilitating the understanding of the presently subject matter.

In the vehicle headlamp 90, the light source unit 20 can have the light guide plate 21 curved to correct the spherical aberration of the projection lens 11 configured to project the image of the light emission surface 21b in accordance with the direction of the spherical aberration with respect to the horizontal direction.

The vehicle headlamp 90 having such a configuration can provide the same operation as that of the vehicle headlamp 10 shown in FIG. 5. In addition to this, the vehicle headlamp 90 can have a curved light guide plate 21 corresponding to the spherical aberration of the projection lens 11. Accordingly, the curvature of the light guide plate 21 can correct the spherical aberration of the projection lens 11.

This means that the light distribution pattern of light emitted from the light guide plate 21 and projected by the projection lens 11 forward in the direction of light illumination can be formed with less adverse effect of the spherical aberration of the projection lens 11.

Alternatively, taking the correction effect of the spherical aberration by the curvature of the light guide plate 21 into consideration, the projection lens can be allowed to have the spherical aberration to some extent. This means the vehicle headlamp 90 can employ relatively cheap projection lenses. This configuration thus can reduce the parts cost.

Figure 18A:
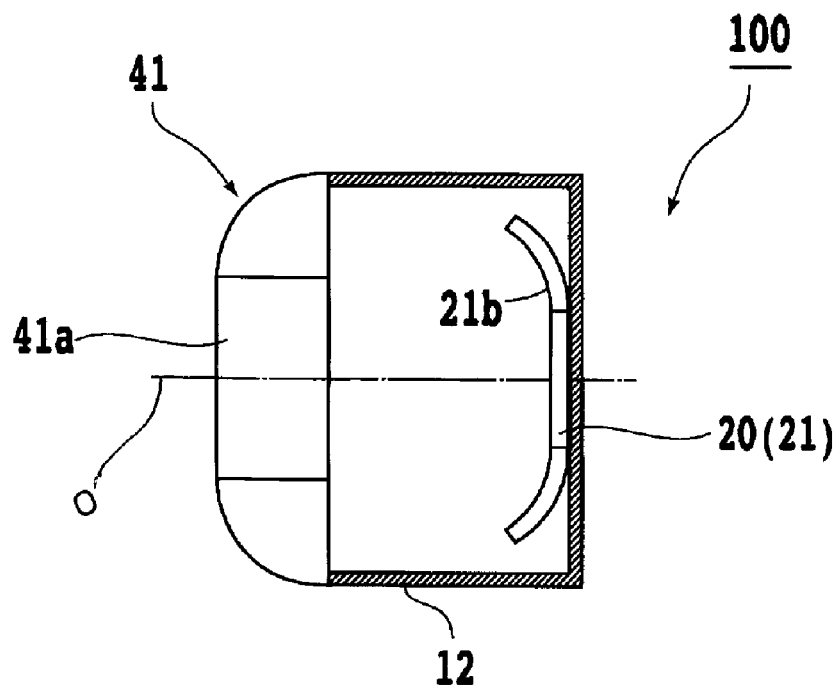
FIGS. 18A and 18B are a schematic cross-sectional view and a schematic longitudinal cross-sectional view, respectively, showing the configuration of a ninth exemplary embodiment of a vehicle headlamp made in accordance with principles of the presently disclosed subject matter.
Figure 18B:
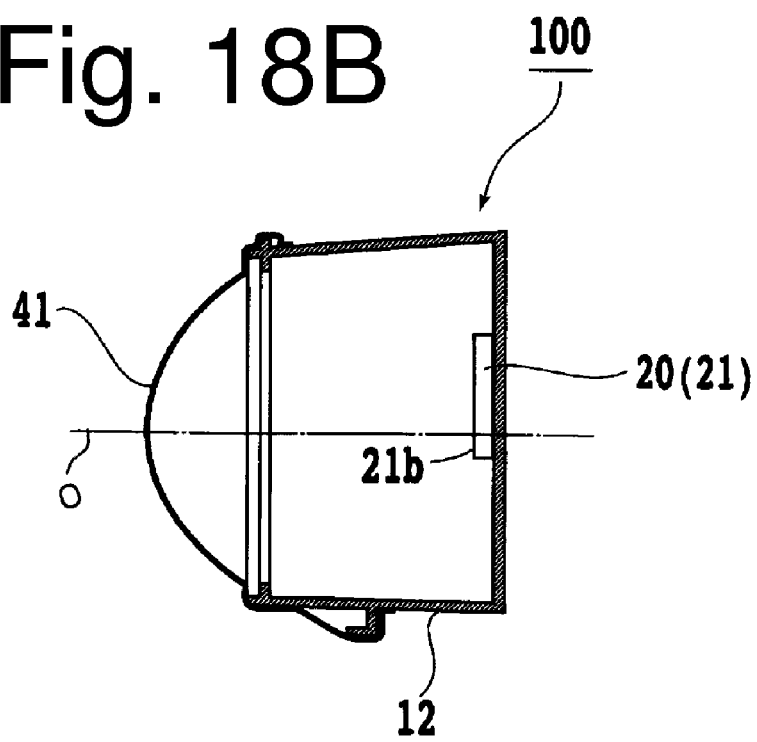

FIGS. 18A and 18B show the configuration of the vehicle headlamp according to a ninth exemplary embodiment of the presently disclosed subject matter.

In FIGS. 18A and 18B, the vehicle headlamp 100 can have the same configuration as that of the vehicle headlamp 50 shown in FIGS. 13A and 13B. The same or similar components will thus be designated with the same reference numerals and the descriptions thereof will be omitted here. In addition to this, some components which are the same or similar components as those in the previous exemplary embodiments are omitted in the drawings for facilitating the understanding of the presently subject matter.

When compared with the vehicle headlamp 50 of FIGS. 13A and 13B, in the vehicle headlamp 100 the light source unit 20 can have the light guide plate 21 curved to correct the spherical aberration of the projection lens 41 configured to project the image of the light emission surface 21b in accordance with the direction of the spherical aberration with respect to the horizontal direction.

The vehicle headlamp 100 having such a configuration provides the same operation as that of the vehicle headlamp 50 shown in FIGS. 13A and 13B. In addition to this, the vehicle headlamp 100 can have the light guide plate 21 curved in a manner corresponding to the spherical aberration of the projection lens 41. Accordingly, the curvature of the light guide plate 21 can correct the spherical aberration of the projection lens 41.

This means that the light distribution pattern of light emitted from the light guide plate 21 and projected by the projection lens 41 forward in the direction of light illumination can be formed with less adverse effect of the spherical aberration of the projection lens 41.

Alternatively, taking the correction effect of the spherical aberration by the curvature of the light guide plate 21 into consideration, the projection lens can be allowed to have the spherical aberration to some extent. This means the vehicle headlamp 100 can employ relatively cheap projection lenses. This configuration thus can reduce the parts cost.

Figure 19A:
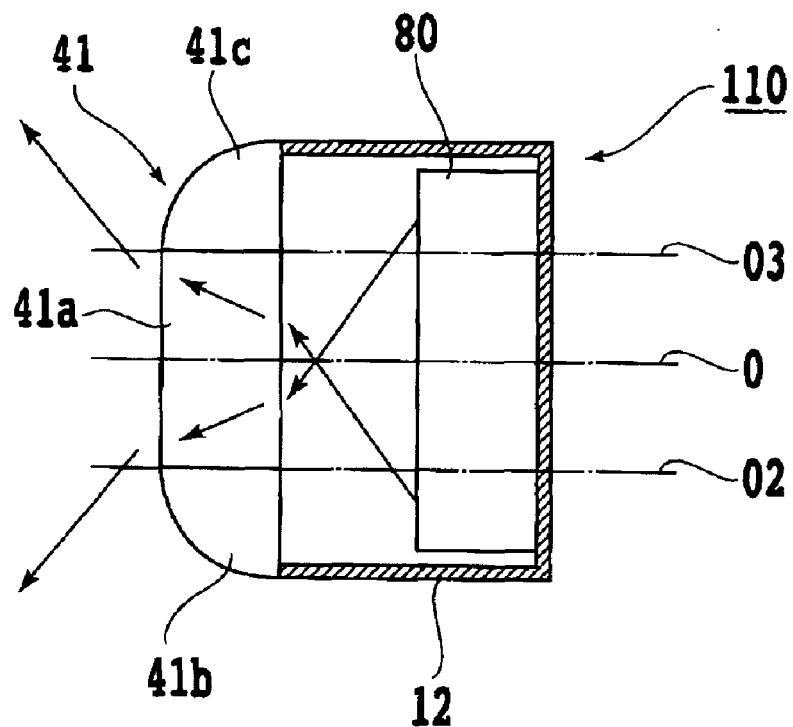
FIGS. 19A and 19B are a schematic cross-sectional view and a schematic longitudinal cross-sectional view, respectively, showing the configuration of a tenth exemplary embodiment of a vehicle headlamp made in accordance with principles of the presently disclosed subject matter.
Figure 19B:
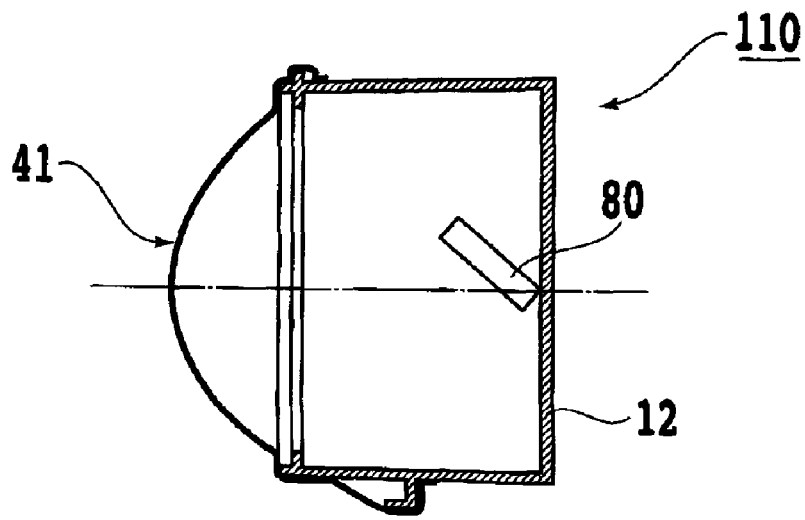

FIGS. 19A and 19B show the configuration of the vehicle headlamp according to a tenth exemplary embodiment of the presently disclosed subject matter.

In FIGS. 19A and 19B, the vehicle headlamp 110 can have the same configuration as that of the vehicle headlamp 40 shown in FIGS. 11A and 11B. The same or similar components will thus be designated with the same reference numerals and the descriptions thereof will be omitted here. In addition to this, some components which are the same or similar components as those in the previous exemplary embodiments are omitted in the drawings for facilitating the understanding of the presently subject matter.

The difference in the vehicle headlamp 110 can be, when compared with the vehicle headlamp 40 of FIGS. 11A and 11B, the provision of the light source unit 80 in place of the light source unit 20.

Figure 20:
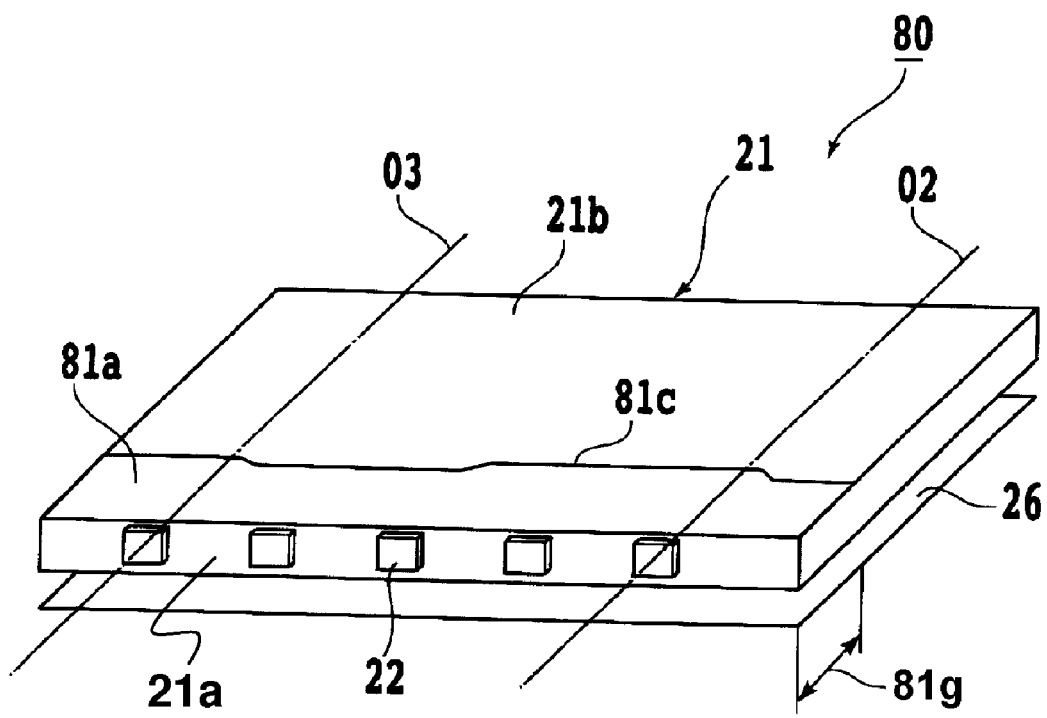
FIG. 20 is a schematic perspective view showing the configuration of the light source unit of the vehicle headlamp shown in FIGS. 19A and 19B.

In this exemplary embodiment, the light source unit 80 shown in FIG. 20 can have a reflection sheet 81a for forming a cutoff line in the light distribution pattern. Specifically, the reflection sheet 81a can have an edge 81c opposite to the light incident side with particular cutoff line areas corresponding to the convex lenses 41b and 41c of the projection lens 41 with respect to the optical axes O2 and O3, respectively.

In the light source unit 80 of the vehicle headlamp 110 with this configuration, the light entering the light guide plate 21 via the light incident surface 21a can be repeatedly reflected by the light guide part 81g between the reflection sheet 81a and the rear surface of the light guide plate 21 or the reflection film 26. In this manner, the incident light can be sufficiently diffused, in particular, in the horizontal directions inside the light guide plate 21. This can reduce the brightness variations ascribable to distances between the LEDs 22.

Furthermore, the reflection sheet 81a can form a cutoff line in the light distribution pattern by the edge 81c thereof with particular cutoff line areas corresponding to the convex lenses 41b and 41c of the projection lens 41 with respect to the optical axes O2 and O3, respectively. The light in the particular light distribution pattern with the cutoff line can be projected by the respective convex lenses 41b and 41c of the projection lens 41 near the center area forward in the direction of light illumination.

Figure 21A:
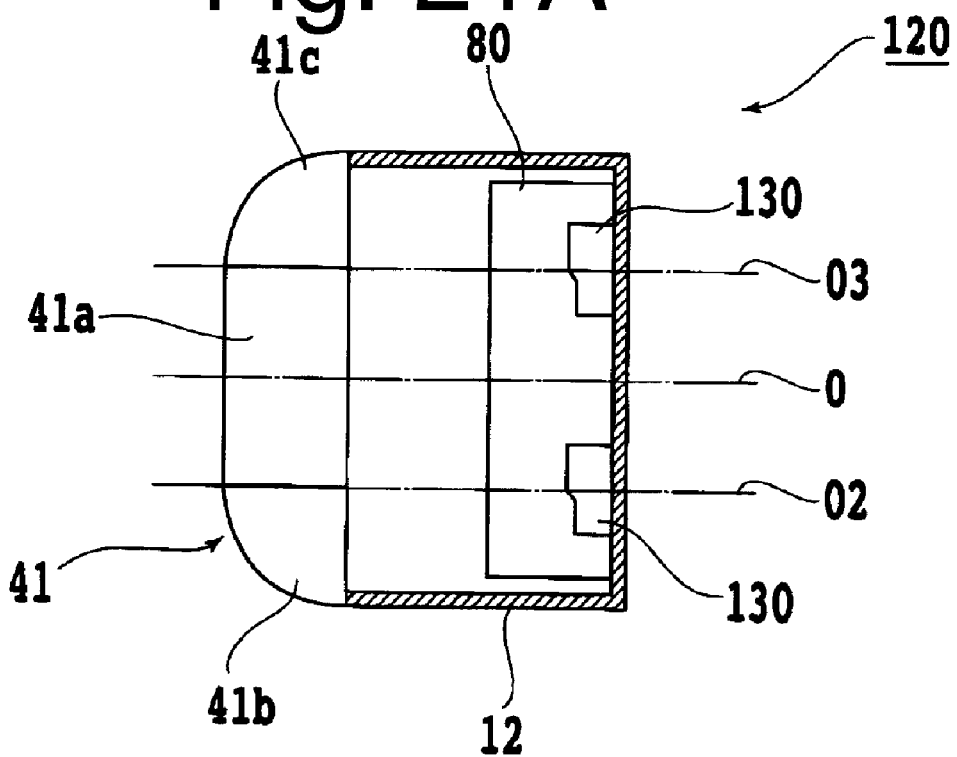
FIGS. 21A and 21B are a schematic cross-sectional view and a schematic longitudinal cross-sectional view, respectively, showing the configuration of a tenth exemplary embodiment of a vehicle headlamp made in accordance with principles of the presently disclosed subject matter.
Figure 21B:
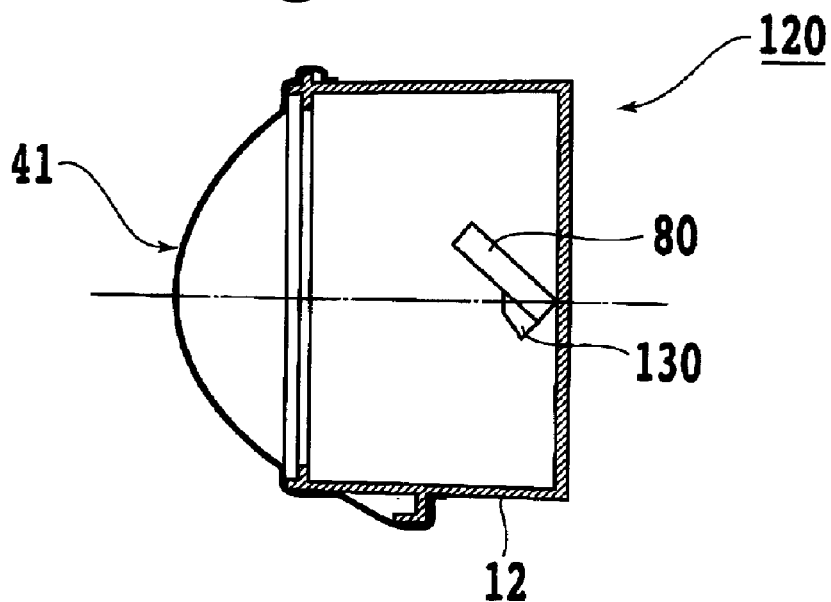

FIGS. 21A and 21B show the configuration of a vehicle headlamp according to an eleventh exemplary embodiment of the presently disclosed subject matter.

In FIGS. 21A and 21B, the vehicle headlamp 120 can have the same configuration as that of the vehicle headlamp 110 shown in FIGS. 19A and 19B. The same or similar components will thus be designated with the same reference numerals and the descriptions thereof will be omitted here. In addition to this, some components which are the same or similar components as those in the previous exemplary embodiments are omitted in the drawings for facilitating the understanding of the presently subject matter.

When compared with the vehicle headlamp 110 shown in FIGS. 19A and 19B, the vehicle headlamp 120 can have separate high beam light source units 130 with respect to the optical axes O2 and O3 of the convex lenses 41b and 41c of the projection lens 41 in addition to the light source unit 80.

Figure 22:
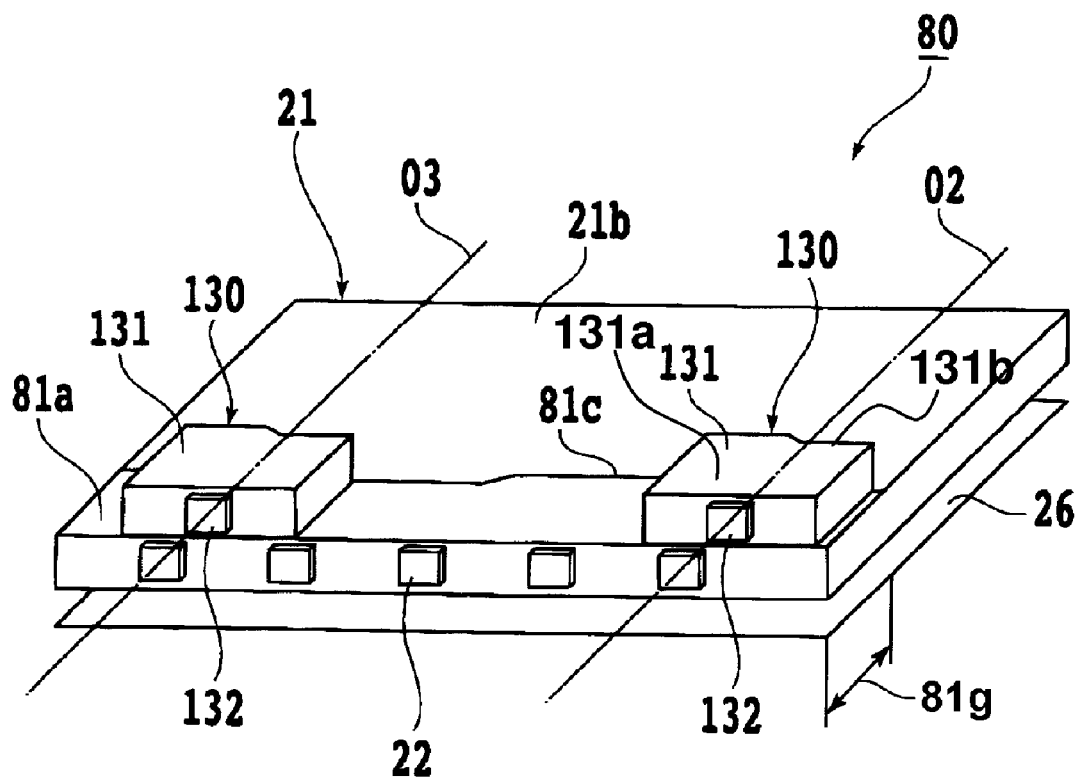
FIG. 22 is a schematic perspective view showing the configuration of the light source unit and the high beam light source unit of the vehicle headlamp shown in FIGS. 21A and 21B.

The separate light source unit 130 or high beam light source unit 130 can include a light guide plate 131 and an LED 132 serving as a light source, as shown in FIG. 22.

The light guide plate 131 can have the same configuration as, or similar to, the light guide plate 21 shown in FIG. 6. The light guide plate 131 can be arranged on the reflection sheet 81a so that the light guide plate 131 is positioned within the area covered by the reflection sheet 81a as shown in FIG. 22.

The light guide plate 131 can have a light emission surface 131a (on the upper side in FIG. 22). The light emission surface 131a can have an edge 131b opposite to the LED 132, and the edge 131b can be formed to have a shape corresponding to the edge 81c of the reflection sheet 81a.

The light guide plate 131 can have a width of 16 mm to 20 mm with the optical axis O2 or O3 as its center.

In the vehicle headlamp 120 with this configuration, when only the LEDs 22 of the light source unit 80 are driven, the low beam light distribution pattern can be projected through the projection lens 41 forward in the direction of light illumination as in the vehicle headlamp 110 shown in FIGS. 19A and 19B.

In this exemplary embodiment, the high beam light source units 130 can be hidden by the reflection sheet 81a when seen from the LED 22 side. Accordingly, the light emitted from the LEDs 22 can be guided by the light guide plate 21 and projected from the light emission surface 21a to the projection lens 41 without interruption by the high beam light source units 130.

When the LEDs 132 of the high beam light source units 130 are driven to emit light in addition to the LEDs 22 of the light source unit 80, the light from the high beam light source units 130 can be projected to the respective convex lenses 41b and 41c of the projection lens 41 in addition to the low beam light distribution pattern formed by the light source unit 80. Accordingly, an additional light distribution pattern composed of the spot light formed by the respective convex lenses 41b and 41c can be provided above the cutoff line of the low beam light distribution formed by the edge 81c of the reflection sheet 81a.

As a result, a favorable high beam light distribution pattern can be formed as a whole by the light source unit 80 and the high beam light source unit 130.

It should be noted that the vehicle headlamp of the present exemplary embodiment can be combined with any of the first to tenth exemplary embodiments. With such a combination, it is possible to obtain a synergic effect derived from the presently disclosed subject matter.

Figure 23A:
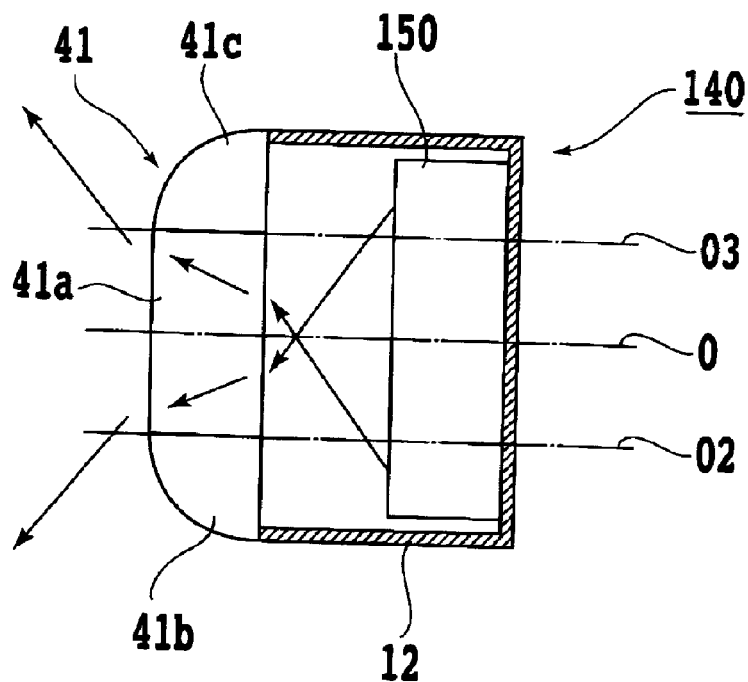
FIGS. 23A and 23B are a schematic cross-sectional view and a schematic longitudinal cross-sectional view, respectively, showing the configuration of a twelfth exemplary embodiment of a vehicle headlamp made in accordance with principles of the presently disclosed subject matter.
Figure 23B:
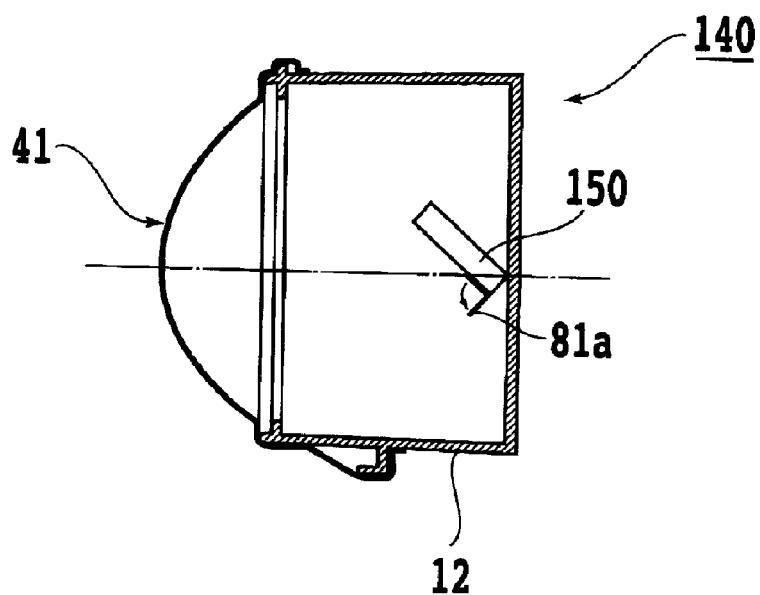

FIGS. 23A and 23B show the configuration of the vehicle headlamp according to a twelfth exemplary embodiment of the presently disclosed subject matter.

In FIGS. 23A and 23B, the vehicle headlamp 140 can have the same configuration as that of the vehicle headlamp 110 shown in FIGS. 19A and 19B. The same or similar components will thus be designated with the same reference numerals and the descriptions thereof will be omitted here. In addition to this, some components which are the same or similar components as those in the previous exemplary embodiments are omitted in the drawings for facilitating the understanding of the presently subject matter.

The difference in the vehicle headlamp 140 can be, when compared with the vehicle headlamp 110 of FIGS. 19A and 19B, the provision of the light source unit 150 in place of the light source unit 20.

Figure 24:
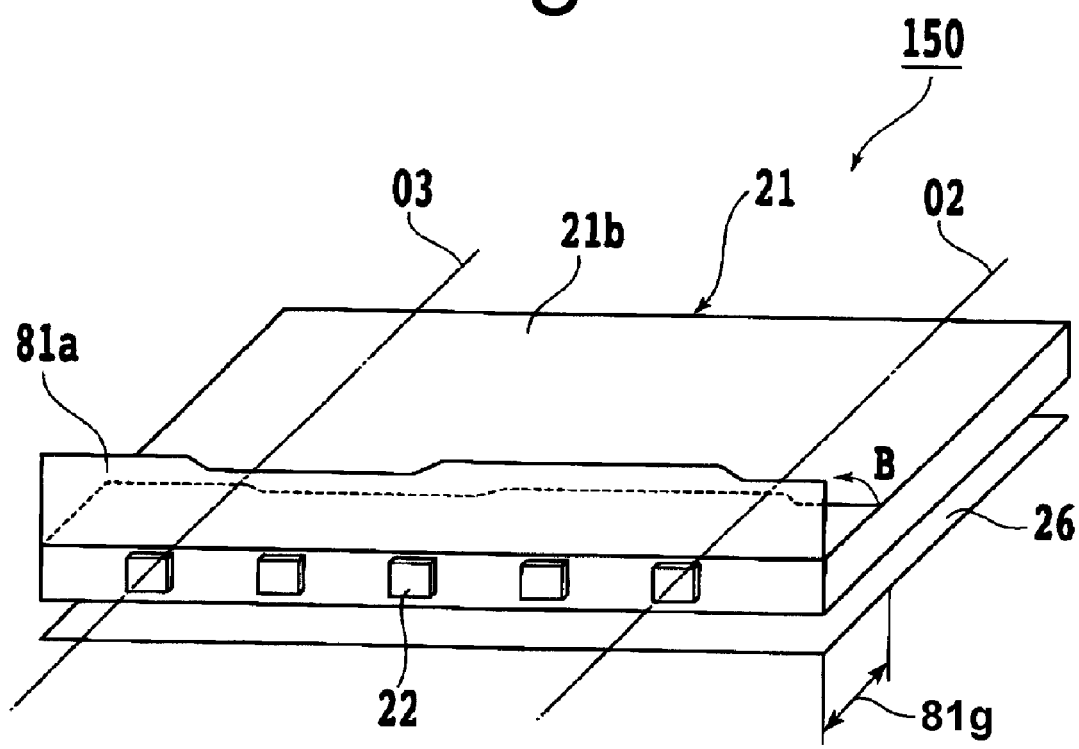
FIG. 24 is a schematic perspective view showing the configuration of the light source unit of the vehicle headlamp in FIGS. 23A and 23B.

The light source unit 150 can have the configuration shown in FIG. 24. Namely, when compared with the light source unit 80 shown in FIGS. 19A and 19B, the light source unit 150 can be configured such that the reflection sheet 81a can be supported on the light incident surface 21a side of the light guide plate 21 so as to be pivotally retractable from the surface of the light guide plate 21 as shown by the arrow B.

The reflection sheet 81a can be moved by a not-shown driving mechanism. By using the driving mechanism, the reflection sheet 81a can be arranged at a working position where the reflection sheet 81a is brought in contact with the light emission surface 21b of the light guide plate 21 or at an extended position where the reflection sheet 81a extends away from the light emission surface 21b of the light guide plate 21.

In the vehicle headlamp 140 with this configuration, when the reflection sheet 81a is arranged at the working position and only the LEDs 22 of the light source unit 150 are driven, the low beam light distribution pattern can be projected through the projection lens 41 forward in the direction of light illumination as in the vehicle headlamp 110 shown in FIGS. 19A and 19B.

When the reflection sheet 81a is moved to be positioned at the retracted position, part of the light to be emitted from the light emission surface 21b of the light source unit 150 is not shielded by the reflection sheet 81a. Namely, the entire light emitted from the light emission surface 21b can be projected through the projection lens 41 forward in the direction of light illumination. In this case, any cutoff line by the edge 81c of the reflection sheet 81 is not formed so that an appropriate high beam light distribution pattern can be formed.

It should be noted that a vehicle headlamp according to the disclosed subject matter can be combined with or a combination of any of the first to eleventh exemplary embodiments. In this case, it is possible to obtain a synergic effect derived from the presently disclosed subject matter.

The foregoing exemplary embodiments have dealt with the cases where the vehicle headlamp has a light distribution characteristic intended for a low beam of a right-hand drive car. That is, the cutoff pattern may be configured not to project light to above the horizontal level on the left side of the vehicle as viewed forward, so as not to cast glare to oncoming cars. The presently disclosed subject matter is not limited thereto, however. The vehicle headlamps can also provide the same effects for left-hand drive cars if their cutoff pattern is horizontally inverted.

The foregoing exemplary embodiments have also dealt with the cases where a plurality of point sources such as LEDs 22 can be used as the light sources. The presently disclosed subject matter is not limited thereto, however. Other types of point sources such as semiconductor laser devices can also be used. Line sources can also be used as far as the light guide plate 21 can internally define the predetermined brightness distribution on the light emission surface 21b by means of the brightness control element 24.

The foregoing vehicle headlamps 120 and 140 according to the eleventh and twelfth exemplary embodiments are configured to form an appropriate high beam light distribution pattern. In this case, the LEDs 22 of the light source unit 80 or the LED 132 of the light source unit 130 can be adjusted in luminous intensity, to emit light with a relatively lower luminous intensity. This configuration can allow the entire vehicle lamp to operate as a day-time running light.

The vehicle lamp according to the presently disclosed subject matter is not limited to a front headlamp, but can also be applied to any kind of vehicle light including a fog lamp, a driving lamp, and other auxiliary lamps, traffic lamps, headlamps, or the like.

According to the presently disclosed subject matter, there can be provided a vehicle headlamp which can produce two or more light distribution patterns for illumination, such as "headlamp+DRL" and "fog lamp+DRL."

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lamp comprising:
a light source unit including,
    a light source including at least one of a point light source and a line light source,
    a light guide plate transparent to visible light, and including a light emission surface, a first end face facing the light source, a second end face opposite to the first end face, a rear surface, and a prism array adjacent the rear surface, extending with a serrated cross section from the first end face of the light guide plate to the second end face, and extending in a direction parallel with the first end face and including a plurality of prism surfaces, with each of the prism surfaces obliquely formed such that when light enters the light guide plate from the first end face and impinges on the prism surfaces, the light is reflected into small angles of incidence to the light emission surface;
a light guide part adjacent an edge of the light guide plate and on a light source side of the light guide plate, the light guide part configured to reflect light from the light guide plate;
a reflection sheet configured to reflect light from the light guide plate back into the light guide plate and having a shape configured to provide a cutoff pattern, the reflection sheet located adjacent an edge of the light guide plate adjacent the light source; and
a projection lens configured to focus light emitted from the light source unit and to project the same forward in a direction of light illumination, the projection lens including a focus located substantially on the light emission surface.

2. The vehicle lamp according to claim 1, further comprising a high beam light source unit disposed adjacent the reflection sheet closer to the projection lens.

3. The vehicle lamp according to claim 1, wherein the reflection sheet is movable relative to an area of the surface of the light guide plate between a working position where the reflection sheet extends along the area so that light reaching the area where the reflection sheet is positioned is reflected by the reflection sheet and an extended position where the reflection sheet extends away from the surface of the light guide plate so that light reaching the area is projected through the projection lens in the direction of light illumination without reflection by the reflection sheet and forms a high beam distribution pattern.

4. The vehicle lamp according to claim 3, wherein the projection lens is configured as a cylindrical lens having a longitudinal axis extending in a lateral direction.

5. The vehicle lamp according to claim 4, wherein the projection lens further comprises a pair of convex lenses and the cylindrical lens extends therebetween.

6. The vehicle lamp according to claim 5, wherein each of the prism surfaces of the prism array and the light emission surface of the light guide plate form an angle of 0 degrees to 45 degrees.

7. The vehicle lamp according to claim 6, wherein the light emission surface of the light guide plate includes a cutoff portion configured to provide a predetermined cutoff pattern.

8. The vehicle lamp according to claim 7, wherein the first end face of the light guide plate is adjacent the cutoff portion.

9. The vehicle lamp according to claim 8, wherein the light guide plate is configured to correct a spherical aberration of the projection lens.

10. The vehicle lamp according to claim 9, wherein the light guide plate is curved to correct the spherical aberration of the projection lens.

11. The vehicle lamp according to claim 10, further comprising:
an optical sheet configured so that a direction of a maximum luminous intensity of the light emitted from the light guide plate coincides with a direction of an optical axis of the projection lens, with the optical sheet being disposed near the light emission surface of the light guide plate.

12. The vehicle lamp according to claim 10, wherein the light guide plate is disposed obliquely with respect to an optical axis of the projection lens by a predetermined angle in order to maximize the light entering the projection lens.

13. The vehicle lamp according to claim 2, wherein the high beam light source unit includes a high beam light source, and a high beam light guide plate configured to guide light from the high beam light source forward in the direction of light illumination.

14. The vehicle lamp according to claim 2, wherein the projection lens includes a pair of convex lenses and a cylindrical lens extending therebetween, the high beam light source unit is provided adjacent the optical axis of at least one of the convex lenses.

15. The vehicle lamp according to claim 14, wherein the high beam light source unit emits light with a low intensity to form a day-time running light (DRL) distribution pattern in the direction of light illumination.

16. The vehicle lamp according to claim 2, wherein the projection lens is configured as a cylindrical lens having a longitudinal axis extending in a lateral direction.

17. The vehicle lamp according to claim 1, wherein each of the prism surfaces of the prism array and the light emission surface of the light guide plate form an angle of 0 degrees to 45 degrees.

18. The vehicle lamp according to claim 1, wherein the light emission surface of the light guide plate includes a cutoff portion configured to provide a predetermined cutoff pattern.

19. The vehicle lamp according to claim 1, wherein the light guide plate is configured to correct a spherical aberration of the projection lens.

20. The vehicle lamp according to claim 1, further comprising:
an optical sheet configured so that a direction of a maximum luminous intensity of the light emitted from the light guide plate coincides with a direction of an optical axis of the projection lens, with the optical sheet being disposed near the light emission surface of the light guide plate.

21. The vehicle lamp according to claim 1, wherein the light guide plate is disposed obliquely with respect to an optical axis of the projection lens by a predetermined angle in order to maximize light entering the projection lens.

22. The vehicle lamp according to claim 13, wherein the high beam light source unit emits light with a low intensity to form a day-time running light (DRL) distribution pattern in the direction of light illumination.

23. The vehicle lamp according to claim 2, wherein the high beam light source unit emits light with a low intensity to form a day-time running light (DRL) distribution pattern in the direction of light illumination.

* * * * *